United States Patent
Fang et al.

(10) Patent No.: US 10,795,826 B2
(45) Date of Patent: Oct. 6, 2020

(54) TRANSLATION LOOKASIDE BUFFER MANAGEMENT METHOD AND MULTI-CORE PROCESSOR

(71) Applicant: HUAWEI TECHNOLOGIES CO., LTD., Shenzhen (CN)

(72) Inventors: Lei Fang, Hangzhou (CN); Weiguang Cai, Hangzhou (CN); Xiongli Gu, Hangzhou (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 50 days.

(21) Appl. No.: 16/178,676

(22) Filed: Nov. 2, 2018

(65) Prior Publication Data
US 2019/0073315 A1 Mar. 7, 2019

Related U.S. Application Data

(63) Continuation of application No. PCT/CN2016/080867, filed on May 3, 2016.

(51) Int. Cl.
*G06F 12/10* (2016.01)
*G06F 12/1027* (2016.01)
(Continued)

(52) U.S. Cl.
CPC ...... *G06F 12/1027* (2013.01); *G06F 12/0806* (2013.01); *G06F 12/0842* (2013.01);
(Continued)

(58) Field of Classification Search
CPC combination set(s) only.
See application file for complete search history.

(56) References Cited

U.S. PATENT DOCUMENTS 5,043,882 A * 8/1991 Ikeno ............... G06F 13/26
710/268
6,105,113 A 8/2000 Schimmel
(Continued)

FOREIGN PATENT DOCUMENTS

CN 1506849 A 6/2004
CN 1848095 A 10/2006
(Continued)

OTHER PUBLICATIONS

A. Bhattacharjee, "Large-reach memory management unit caches: Coalesced and shared memory management unit caches to accelerate TLB miss handling," 2013 46th Annual IEEE/ACM International Symposium on Microarchitecture (MICRO), Davis, CA, 2013, pp. 383-394. (Year: 2013).*
(Continued)

*Primary Examiner* — Khoa D Doan
(74) *Attorney, Agent, or Firm* — Westerman, Hattori, Daniels & Adrian, LLP

(57) ABSTRACT

A translation lookaside buffer (TLB) management method and a multi-core processor are provided. The method includes: receiving, by a first core, a first address translation request; querying a TLB of the first core based on the first address translation request; determining that a first target TLB entry corresponding to the first address translation request is missing in the TLB of the first core, obtaining the first target TLB entry; determining that entry storage in the TLB of the first core is full; determining a second core from cores in an idle state in the multi-core processor; replacing a first entry in the TLB of the first core with the first target TLB entry; storing the first entry in a TLB of the second core. Accordingly, a TLB miss rate is reduced and program execution is accelerated.

18 Claims, 9 Drawing Sheets

(51) Int. Cl.
*G06F 12/0806* (2016.01)
*G06F 12/128* (2016.01)
*G06F 12/0842* (2016.01)
*G06F 12/1009* (2016.01)
*G06F 12/0811* (2016.01)

(52) U.S. Cl.
CPC ........ *G06F 12/1009* (2013.01); *G06F 12/128* (2013.01); *G06F 12/0811* (2013.01); *G06F 2212/684* (2013.01)

(56) References Cited

U.S. PATENT DOCUMENTS

| | | | | |
|---|---|---|---|---|
| 6,922,755 | B1* | 7/2005 | Safranek | G06F 12/0826 |
| | | | | 711/131 |
| 7,774,549 | B2* | 8/2010 | Vishin | G06F 12/0806 |
| | | | | 711/133 |
| 8,161,242 | B2* | 4/2012 | Qureshi | G06F 12/0802 |
| | | | | 711/118 |
| 8,180,967 | B2* | 5/2012 | Rajwar | G06F 9/30087 |
| | | | | 711/135 |
| 9,021,207 | B2* | 4/2015 | Kalamatianos | G06F 12/121 |
| | | | | 711/133 |
| 9,110,718 | B2* | 8/2015 | Moir | G06F 9/50 |
| 9,348,752 | B1* | 5/2016 | Parakh | G06F 11/1451 |
| 9,529,730 | B2* | 12/2016 | Sadoughi-Yarandi | G06F 12/122 |
| 2003/0103526 | A1* | 6/2003 | McBride | G06F 12/0813 |
| | | | | 370/466 |
| 2004/0059875 | A1 | 3/2004 | Garg et al. | |
| 2004/0117587 | A1 | 6/2004 | Arimilli et al. | |
| 2005/0027960 | A1 | 2/2005 | Dement et al. | |
| 2006/0143390 | A1 | 6/2006 | Kottapalli | |
| 2007/0094450 | A1* | 4/2007 | VanderWiel | G06F 12/128 |
| | | | | 711/133 |
| 2007/0204121 | A1* | 8/2007 | O'Connor | G06F 12/126 |
| | | | | 711/163 |
| 2008/0040555 | A1* | 2/2008 | Iyer | G06F 12/0811 |
| | | | | 711/133 |
| 2008/0059707 | A1* | 3/2008 | Makineni | G06F 12/0897 |
| | | | | 711/122 |
| 2008/0091880 | A1* | 4/2008 | Vishin | G06F 12/0806 |
| | | | | 711/122 |
| 2010/0146209 | A1* | 6/2010 | Burger | G06F 12/0813 |
| | | | | 711/120 |
| 2010/0191916 | A1* | 7/2010 | Balakrishnan | G06F 12/0808 |
| | | | | 711/134 |
| 2010/0235579 | A1* | 9/2010 | Biles | G06F 12/0862 |
| | | | | 711/125 |
| 2011/0145501 | A1* | 6/2011 | Steely, Jr. | G06F 12/0806 |
| | | | | 711/121 |
| 2012/0079232 | A1 | 3/2012 | Hinton et al. | |
| 2012/0117301 | A1* | 5/2012 | Wingard | G06F 12/1027 |
| | | | | 711/6 |
| 2014/0052917 | A1 | 2/2014 | Koka et al. | |
| 2014/0122829 | A1 | 5/2014 | Barrow-Williams et al. | |
| 2014/0181413 | A1* | 6/2014 | Manne | G06F 12/0891 |
| | | | | 711/135 |
| 2014/0317358 | A1 | 10/2014 | Meier et al. | |
| 2015/0067259 | A1* | 3/2015 | Wang | G06F 12/0811 |
| | | | | 711/122 |
| 2015/0309944 | A1* | 10/2015 | Sadoughi-Yarandi | G06F 12/122 |
| | | | | 711/136 |
| 2015/0378901 | A1* | 12/2015 | Bradbury | G06F 9/467 |
| | | | | 711/122 |
| 2016/0147666 | A1 | 5/2016 | Li et al. | |
| 2017/0010968 | A1* | 1/2017 | Li | G06F 16/2471 |
| 2017/0075818 | A1 | 3/2017 | Liu et al. | |
| 2017/0278215 | A1* | 9/2017 | Appu | G06T 1/60 |
| 2017/0300427 | A1* | 10/2017 | Lin | G06F 12/128 |
| 2019/0041895 | A1* | 2/2019 | Miao | H03K 5/1506 |
| 2019/0303294 | A1* | 10/2019 | Heirman | G06F 12/0815 |

FOREIGN PATENT DOCUMENTS

| | | |
|---|---|---|
| CN | 103119570 A | 5/2013 |
| CN | 103778072 A | 5/2014 |
| CN | 104346294 A | 2/2015 |
| CN | 105095094 A | 11/2015 |
| CN | 105518631 A | 4/2016 |

OTHER PUBLICATIONS

B. Qian and L. Yan, "The research of the inclusive cache used in multi-core processor," 2008 International Conference on Electronic Packaging Technology & High Density Packaging, Shanghai, 2008. (Year: 2008).*

C. Villavieja et al., "DiDi: Mitigating the Performance Impact of TLB Shootdowns Using a Shared TLB Directory," 2011 International Conference on Parallel Architectures and Compilation Techniques, Galveston, TX, 2011, pp. 340-349, 2011 . (Year: 2011).*

* cited by examiner

200

A first core receives a first address translation request, and queries a TLB of the first core based on the first address translation request ~ 210

When determining that a first target TLB entry corresponding to the first address translation request is missing in the TLB of the first core, the first core obtains the first target TLB entry ~ 220

When determining that entry storage in the TLB of the first core is full, the first core determines a second core from cores in an idle state in a multi-core processor ~ 230

The first core replaces a first entry in the TLB of the first core with the first target TLB entry, and stores the first entry into a TLB of the second core ~ 240

FIG. 2

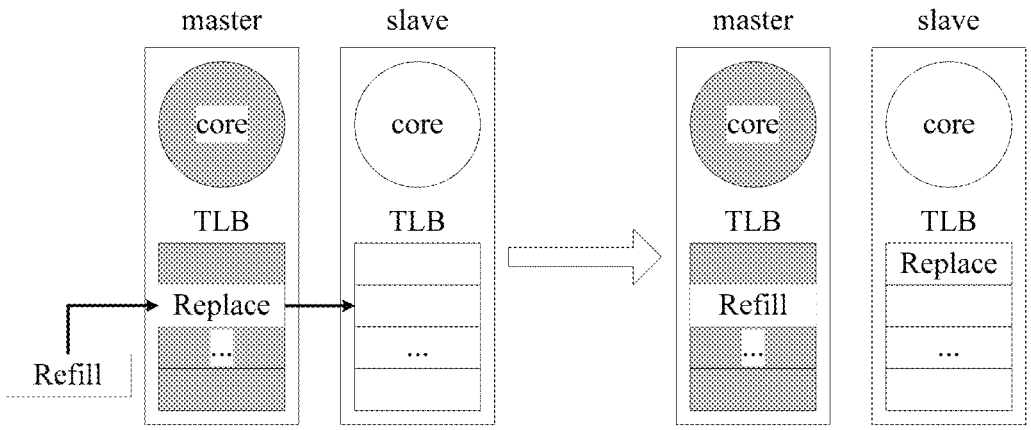

FIG. 3

TRANSLATION LOOKASIDE BUFFER MANAGEMENT METHOD AND MULTI-CORE PROCESSOR

CROSS-REFERENCE TO RELATED APPLICATIONS

This application is a continuation of International Application No. PCT/CN2016/080867, filed on May 3, 2016, the disclosure of which is hereby incorporated by reference in its entirety.

TECHNICAL FIELD

The present disclosure relates to the field of information technologies, and more specifically, to a translation lookaside buffer (TLB) management method and a multi-core processor.

BACKGROUND

A user program usually runs in a virtual address space. During execution of the user program, an operating system (OS) and a memory management unit (MMU) are responsible for translating a virtual address carried in a memory access request into a physical address of a corresponding physical memory space. A virtual address includes a virtual page number (VPN) and an intra-page offset, and a physical address includes a physical frame number (PFN) and an intra-page offset. During a process of translating the virtual address into the physical address, the intra-page offset in the virtual address and the intra-page offset in the physical address remain unchanged, and the virtual page number is translated into the physical frame number by using a mapping relationship. Generally, the mapping relationship is stored in a form of an entry in a page table in a memory. An address translation requires processing of the operating system and accessing to the page table in the memory, which causes a relatively large delay and performance loss. Therefore, each processor core (hereinafter referred to as a core) of a chip multi-processor (CMP) (also called a multi-core processor) stores a translation lookaside buffer TLB, and the TLB stores some VPN-to-PFN translation entries.

With development of technologies, in an existing multi-core scenario, a program working set in a system keeps increasing, that is, programs and to-be-processed data keep increasing. However, a storage space of a TLB in a core is limited. With the increase of application programs and to-be-processed data, entries stored in the TLB in the existing cores cannot meet a use requirement. As a result, a currently required TLB translation entry is possibly missing in the TLB (that is, TLB Miss), or a TLB miss rate is increased. If the currently required TLB translation entry is missing, the core usually needs to obtain the TLB translation entry from the memory through processing of the operating system and accessing to the page table in the memory. This may lead to a relatively large delay and performance loss, thereby reducing program execution efficiency.

Therefore, how to reduce the TLB miss rate and accelerate program execution becomes a problem to be urgently addressed.

SUMMARY

Embodiments of the present disclosure provide a translation lookaside buffer processing method and a multi-core processor. The method can expand a TLB capacity of a core in a working state, thereby reducing a TLB miss rate and accelerate program execution.

According to a first aspect, a translation lookaside buffer TLB management method is provided and is applied to a multi-core processor, where the multi-core processor includes a first core, the first core includes a TLB, and the method includes:

receiving, by the first core, a first address translation request, and querying the TLB of the first core based on the first address translation request;

when determining that a first target TLB entry corresponding to the first address translation request is missing in the TLB of the first core, obtaining, by the first core, the first target TLB entry;

when determining that entry storage in the TLB of the first core is full, determining, by the first core, a second core from cores in an idle state in the multi-core processor; and replacing, by the first core, a first entry in the TLB of the first core with the first target TLB entry, and storing the first entry into a TLB of the second core.

Specifically, the first core may obtain the first target TLB entry from another core of the multi-core processor. For example, the first core may broadcast a TLB query request to other cores of a multi-core system, where the broadcast TLB query request carries a virtual address causing a miss, that is, a virtual address corresponding to the first target TLB entry. After receiving the broadcast address, the other cores search local TLBs for the virtual address. If a TLB of a processor core is hit, the first target TLB entry may be fed back to the first core.

In this way, the first core can rapidly obtain the first target TLB entry from the another core, thereby avoiding that the first core sends a query request to an operating system to obtain the first target TLB entry from a memory. This can save time and improve application efficiency.

In addition, the first core may also obtain the first target TLB entry from a page table of the memory. For example, the first core sends the query request to the operating system, where the query request carries the virtual address causing the miss, and obtains the first target TLB entry from the page table of the memory after processing of the operating system. This is not limited in this embodiment of the present disclosure.

In other words, when a TLB miss (Miss) occurs in the first core (or a working core or a working node) and entry storage in the local TLB is full, to store the obtained first target TLB entry, the first core needs to replace a valid TLB entry with the first target TLB entry. In this case, the first core attempts to obtain more TLB resources to save the replaced TLB entry. Therefore, the first core needs to determine the second core from the idle cores.

Therefore, in this embodiment of the present disclosure, the replaced TLB entry is stored by using a TLB resource in the idle core. This not only increases utilization of the TLB resource of the idle core, but also indirectly increases a capacity of the TLB of the first core, reduces a possibility of obtaining the target TLB entry by the first core from the memory, and accelerates program execution.

It should be understood that a core included in the multi-core processor in this embodiment of the present disclosure may also be called a node. A node in this specification may be equivalent to a core in the multi-core processor.

For example, the first core replaces the first entry at a first entry position in the TLB of the first core with the first target TLB entry, and stores the first entry into the TLB of the second core.

It should be understood that the first entry position may be any entry position in a TLB of a master core. This is not limited in this embodiment of the present disclosure. In other words, the first entry may be any TLB entry in the TLB of the first core. For example, the first entry may be a first entry, a last entry, or an intermediate entry in the TLB of the first core. This is not limited in this embodiment of the present disclosure.

In other words, when the entry storage in the TLB of the first core is full and the first target TLB entry is missing, the first core needs to store the first target TLB entry at the first entry position in the TLB of the first core, and store the first entry that is replaced from the first entry position into the TLB of the second core.

In this embodiment of the present disclosure, the first core may be called a master core of the second core, and the second core may be called a slave core (or a spare core) of the first core.

It should be understood that the master core (Master) writes a TLB entry into the TLB of the slave core (Slave). This process occurs when the TLB entry in the master is replaced. After the master obtains the first target TLB entry, because the TLB entry storage of the master core is full, the first target TLB entry needs to be filled to the first entry position. To be specific, the first entry at the first entry position is replaced with the first target TLB entry, and then the first entry is stored into the TLB of the slave core (Slave) (for example, the second core).

In a process in which the replaced entry is written into the TLB of the slave, the slave saves a write position. In this embodiment of the present disclosure, an alternate write mechanism may be used. That is, if a quantity of TLB entries of the slave core is N, writing starts sequentially from a first entry to an $(N-1)^{th}$ entry, that is, starts from 0 until the entry storage is full. A TLB processing method used when the entry storage of the slave core (for example, the second core) is full is described in detail in the following.

In this embodiment of the present disclosure, when the entry storage in the TLB of the first core is full and the first target TLB entry is missing, the first target TLB entry is obtained to replace the first entry in the TLB of the first core, and the first entry is stored into the TLB of the second core, that is, the replaced entry is stored into the TLB of the second core. Therefore, in this embodiment of the present disclosure, a TLB resource of an idle core is used to expand a TLB capacity of a working core, thereby reducing a TLB miss rate and accelerating program execution.

Because the working core, namely the master core (Master) (for example, the first core), writes the replaced TLB entry into the TLB of the idle node, namely the slave core (Slave) (for example, the second core), when the working core needs to use the replaced TLB entry again, the working core does not need to obtain the entry again by using the operating system, but can obtain the entry by directly accessing the TLB of the slave. This greatly reduces a TLB refilling delay and accelerates program execution.

It should be noted that in this embodiment of the present disclosure, an idle core can share a TLB resource of the idle core with only one working core for use, and the working core may obtain TLB resources of a plurality of idle cores to store TLB entries.

Further, in an implementation of the first aspect, the determining, by the first core, a second core from cores in an idle state in the multi-core processor includes:

sending, by the first core, a status query request to each of other cores in the multi-core processor, where the status query request is used to query whether each core is in the idle state;

receiving, by the first core, a response message sent by each of the other cores, where the response message is used to indicate whether each core is in the idle state; and selecting, by the first core based on the response message, a core from the cores in the idle state as the second core.

Therefore, in this embodiment of the present disclosure, the replaced TLB entry is stored by using a TLB resource in the idle core. This not only increases utilization of the TLB resource of the idle core, but also indirectly increases a capacity of the TLB of the first core, reduces a possibility of obtaining the target TLB entry by the first core from the memory, and accelerates program execution.

Further, in another implementation of the first aspect, the selecting, by the first core based on the response message, a core from the cores in the idle state as the second core includes:

determining, by the first core based on the response message, an idle-core list, where the idle-core list includes a core in the idle state in other cores, other than the first core, in the multi-core processor; and selecting, from the idle-core list, an idle core with minimum overheads for communicating with the first core, as the second core.

Therefore, in this embodiment of the present disclosure, the first core selects the idle core with the minimum overheads for communicating with the first core as the second core, and stores a replaced TLB entry into the second core, thereby reducing communication overheads to a greatest extent. In addition, when the first core needs to query for an entry in the TLB of the second core, because the communication overheads are very low, the first core can quickly find the TLB entry, thereby improving program execution efficiency.

A person skilled in the art may understand that selecting the second core based on the minimum overheads for communicating with the first core is a relatively ideal selection manner. In specific implementation, the communication overheads need to be determined based on a congestion level of a network on chip NoC (Network on Chip) router in a multi-core processor chip, and a processor core is selected from idle cores as the second core based on the network congestion level. To simplify a second core selection process, the following implementations may be used.

Further, in another implementation of the first aspect, the selecting, from the idle-core list, an idle core with minimum overheads for communicating with the first core, as the second core includes:

using, by the first core, an idle core that is in the idle-core list and that has minimum hops for communication with the first core, as the second core; or using, by the first core, an idle core that is in the idle-core list and that is at a shortest physical distance from the first core, as the second core.

In this embodiment of the present disclosure, another manner may also be used to determine the core with the minimum communication overheads. This is not limited in this embodiment of the present disclosure.

For example, the first core (which may be called a requesting node herein) broadcasts a status query request (also called a TLB query request) to other cores (also called other nodes) in the multi-core processor, where the status query request is used to query whether each core is in an idle state. After receiving the status query request, each core sends a response message to the first core (the requesting node), where the response message is used to indicate whether the core is in the idle state. In this way, the first core obtains the idle-core list based on the response message. If the idle-core list is blank, TLB resource obtaining is terminated, and a missing TLB entry (that is, the first target TLB entry) of the first core is read from the memory in an existing manner. If the idle-core list is not blank, TLB resource obtaining is performed. To be specific, the first core selects, based on overheads for communicating with idle cores in the idle-core list, an idle core with the minimum communication overheads, and sends a TLB sharing request to the idle core. If the idle core has been shared by another node or the idle core switches to a working state in this case, the idle core sends a failure feedback to the requesting node, so that the idle core is deleted from the idle-node list. Then, the foregoing process is repeated. If the idle core is in the idle state in this case, the idle core is determined as the second core.

Therefore, in this embodiment of the present disclosure, the first core selects the idle core with the minimum overheads for communicating with the first core as the second core, and stores a replaced TLB entry into the second core, thereby reducing communication overheads to a greatest extent. In addition, when the first core needs to query for an entry in the TLB of the second core, because the communication overheads are very low, the first core can quickly find the TLB entry, thereby improving program execution efficiency.

Optionally, in another implementation of the first aspect, after the determining a second core, the method further includes:

recording an identifier of the second core in a TLB spare core list of the first core.

The spare core list herein may also be called a slave core list.

Specifically, after the first core determines the second core from the idle-core list, the second core becomes the slave core (Slave) (also called a spare core) of the first core. The slave core (the second core) writes an identifier (for example, a number) of the first core into a master core (Master) number register of the slave core. The first core becomes the master core (Master) of the second core, and adds an identifier (for example, a number) of the slave core (the second core) to the spare core list of the first core.

Therefore, in this embodiment of the present disclosure, when the TLB entry storage of the first core is full and the first target TLB entry is missing, the first target TLB entry is obtained, the second core is determined, and the second core is recorded into the spare core list of the first core. In this way, based on the spare core list, the first core may read/write the TLB of the second core in the spare core list, thereby increasing the capacity of the TLB of the first core, reducing a TLB miss rate of the first core, and accelerating program execution.

Optionally, in another implementation of the first aspect, after the determining, by the first core, a second core from cores in the idle state in the multi-core processor, the method further includes:

receiving, by the first core, a second address translation request, and querying the TLB of the first core based on the second address translation request;

when determining that a second target TLB entry corresponding to the second address translation request is missing in the TLB of the first core, querying, by the first core, the TLB of the second core; and when finding the second target TLB entry in the TLB of the second core, replacing a second entry in the TLB of the first core with the second target TLB entry, and storing the second entry into the TLB of the second core.

For example, the first core stores the second entry at an original position of the second target TLB entry in the second core. That is, the first core exchanges storage positions of the second entry and the second target TLB entry.

In other words, when a local TLB entry of the master core is missing, the master core reads a TLB entry from the slave core.

The foregoing process occurs when a local TLB miss (Miss) occurs in the master (the first core), that is, the second target TLB entry does not exist in the local TLB. The master reads the TLB entry from the slave. The master sends a TLB read request to all slaves based on the spare core list (Slave List) (also called a slave core list). After receiving the TLB read request, each slave queries a local TLB of the slave core. If the second target TLB is missed, a miss feedback is returned; if the second target TLB is hit, a hit feedback and content of a hit TLB entry are returned. After the master collects all feedbacks, if all the feedbacks are miss feedbacks, the master sends a TLB miss request to the operating system; if a TLB entry in the slave is hit, the master uses the hit TLB entry for refilling. If entry replacement occurs during a refilling process, a replaced entry is written into the hit slave core.

Therefore, in this embodiment of the present disclosure, a working core has permission to read/write a TLB of an idle core. Using a TLB resource in the idle core to save a replaced TLB entry not only increases utilization of the TLB resource of the idle core, but further increases the capacity of the TLB of the first core. When an entry is missing in the TLB of the first core, the target entry may be read from the TLB of the slave core, thereby reducing a possibility of obtaining the target TLB entry by the first core from the memory, accelerating program execution, and improving program execution efficiency.

When a valid TLB entry in the master is replaced and all slaves in the spare core list are full slaves, because entries stored in TLBs of all full slaves are replaced entries of the master, and the entries may be subsequently used by the master, the master expects to obtain more slaves to save a replaced entry.

Correspondingly, in another implementation of the first aspect, the method further includes:

receiving, by the first core, a third address translation request, and querying the TLB of the first core based on the third address translation request;

when determining that a third target TLB entry corresponding to the third address translation request is missing in the TLB of the first core, querying, by the first core, the TLB of the second core;

when determining that the third target TLB entry is missing in the TLB of the second core, obtaining the third target TLB entry;

when determining that entry storage in both the TLB of the first core and the TLB of the second core is full, determining, by the first core, a third core from the cores in the idle state in the multi-core processor; and replacing, by the first core, a third entry in the TLB of the first core with the third target TLB entry, and storing the third entry into a TLB of the third core.

Specifically, when entry storage in the TLB of the master core (the first core) is full and entry storage in TLBs of all slave cores (in this example, there is only one slave core, namely the second core) of the master core is stored, the master core (the first core) determines the third core from other idle cores in the multi-core processor to store the third entry that is in the TLB of the first core and that is replaced with the third target TLB entry.

Therefore, in this embodiment of the present disclosure, after storage of all current slave cores is full, a new slave core is obtained to save the replaced TLB entry, further expanding the capacity of the first core. When the first core queries for the replaced TLB entry again, the first core can directly read from the new slave core, and the first core does not need to obtain the TLB entry from the memory. Therefore, in this embodiment of the present disclosure, program execution can be accelerated and program execution efficiency can be improved.

Optionally, in another implementation of the first aspect, after the first core switches from a working state to the idle state, the method further includes:

sending, by the first core, a TLB release instruction to a core recorded in the TLB spare core list, where the TLB release instruction is used to instruct the core recorded in the spare core list to terminate TLB sharing.

In other words, when the master changes to the idle state, all obtained TLB resources are released. The master sends the TLB release request to all slaves based on the slave list, so that TLB resources of these idle cores can be used by another working core. After the master releases all the obtained TLB resources, the master and the slave both become idle cores, and can be used by another working core.

Therefore, in this embodiment of the present disclosure, after the first core switches to the idle state, the first core releases an obtained TLB resource of a slave core by sending a release instruction to all slave cores. In this way, the TLB resource of the slave core (the idle core) is released, avoiding resource waste. Further, the released TLB resource of the slave core can be used by another working core, thereby increasing a capacity of the another working core and accelerating program execution of the working core.

After the slave core terminates TLB sharing, the slave core may or may not delete the TLB entry stored in the slave core. This is not limited in this embodiment of the present disclosure. For example, after sharing is terminated and the slave core serves as a slave core of another working core, all entries in the TLB may be deleted, so that the another core can store a replaced entry. For another example, after sharing is terminated and when the slave core is in the working state, a previously stored TLB entry may be reserved for searching and use by the slave core itself.

Optionally, in another implementation of the first aspect, after the second core switches from the idle state to a working state, the method further includes:

receiving, by the first core, a TLB sharing termination request sent by the second core, where the TLB sharing termination request carries the identifier of the second core; and deleting, by the first core, the identifier of the second core from the TLB spare core list.

Therefore, in this embodiment of the present disclosure, after the second core switches from the idle state to the working state, the second core sends the TLB sharing termination request to the first core, so that the first core releases the second core, and the second core can use the TLB resource of the second core. This avoids an impact on ongoing service processing in the second core. In addition, the second core may also become another master core and can use a TLB resource of another idle core.

Further, in another implementation of the first aspect, before the deleting, by the first core, the identifier of the second core from the TLB spare core list, the method further includes:

determining, by the first core, a fourth core from the cores in the idle state in the multi-core processor; and copying, by the first core, all entries from the TLB of the second core to a TLB of the fourth core.

In other words, before the master core (for example, the first core) deletes the slave core (for example, the second core) from the spare core list, the master core obtains a new core (a new slave core) (for example, the fourth core) from the multi-core processor. A TLB of the new slave core is used to store all entries in the TLB of the deleted slave core (that is, the second core). In this way, if an entry in the second core needs to be queried in a subsequent query, the entry does not need to be obtained again by using the operating system, and the entry can be obtained by directly accessing the TLB of the slave core (the fourth core). This greatly reduces a TLB refilling delay and accelerates program execution.

Therefore, in this embodiment of the present disclosure, the first core obtains a new slave core (the fourth core) to save all entries in the TLB of the released second core. If the first core needs to query for an entry in the second core in a subsequent query, the first core does not need to re-obtain the entry from the memory by using the operating system. Instead, the first core can directly access the TLB of the slave core (the fourth core) to obtain the entry. This greatly reduces a TLB refilling delay and accelerates program execution.

According to a second aspect, a multi-core processor is provided. The multi-core processor can implement any one of the first aspect or the implementations of the first aspect. The multi-core processor includes a first core, and the first core includes a translation lookaside buffer TLB;

the first core is configured to: receive a first address translation request; query the TLB of the first core based on the first address translation request; when determining that a first target TLB entry corresponding to the first address translation request is missing in the TLB of the first core, obtain the first target TLB entry; when determining that entry storage in the TLB of the first core is full, determine a second core from cores in an idle state in the multi-core processor; and replace a first entry in the TLB of the first core with the first target TLB entry; and the second core is configured to store the first entry into a TLB of the second core.

In this embodiment of the present disclosure, when the entry storage in the TLB of the first core is full and the first target TLB entry is missing, the first target TLB entry is obtained to replace the first entry in the TLB of the first core, and the first entry is stored into the TLB of the second core, that is, the replaced entry is stored into the TLB of the second core. Therefore, in this embodiment of the present disclosure, a TLB resource of an idle core is used to expand a TLB capacity of a working core, thereby reducing a TLB miss rate and accelerating program execution.

Because the working core, namely the master core (Master) (for example, the first core), writes the replaced TLB entry into the TLB of the idle node, namely the slave core (Slave) (for example, the second core), when the working core needs to use the replaced TLB entry again, the working core does not need to obtain the entry again by using an operating system, but can obtain the entry by directly accessing the TLB of the slave. This greatly reduces a TLB refilling delay and accelerates program execution.

It should be noted that in this embodiment of the present disclosure, an idle core can share a TLB resource of the idle core with only one working core for use, and the working core may obtain TLB resources of a plurality of idle cores to store TLB entries.

Optionally, in another implementation of the second aspect, when obtaining the first target TLB entry, the first core is specifically configured to:

obtain the first target TLB entry from a page table in a memory; or obtain the first target TLB entry from another core in a multi-core system.

For example, the first core may broadcast a TLB query request to other cores of the multi-core system, where the broadcast TLB query request carries a virtual address causing a miss, that is, a virtual address corresponding to the first target TLB entry. After receiving the broadcast address, the other cores search local TLBs for the virtual address. If a TLB of a processor core is hit, the first target TLB entry may be fed back to the first core.

In this way, the first core can rapidly obtain the first target TLB entry from the another core, thereby avoiding that the first core sends a query request to the operating system to obtain the first target TLB entry from the memory. This can save time and improve application efficiency.

In addition, the first core may also obtain the first target TLB entry from the page table of the memory. For example, the first core sends the query request to the operating system, where the query request carries the virtual address causing the miss, and obtains the first target TLB entry from the page table of the memory after processing of the operating system. This is not limited in this embodiment of the present disclosure.

Further, in another implementation of the second aspect, when determining a second core from cores in an idle state in the multi-core processor, the first core is specifically configured to:

send a status query request to each of other cores in the multi-core processor, where the status query request is used to query whether each core is in the idle state;

receive a response message sent by each of the other cores, where the response message is used to indicate whether each core is in the idle state; and select, based on the response message, a core from the cores in the idle state as the second core.

Therefore, in this embodiment of the present disclosure, the replaced TLB entry is stored by using a TLB resource in the idle core. This not only increases utilization of the TLB resource of the idle core, but also indirectly increases a capacity of the TLB of the first core, reduces a possibility of obtaining the target TLB entry by the first core from the memory, and accelerates program execution.

Further, in another implementation of the second aspect, when selecting, based on the response message, a core from the cores in the idle state as the second core, the first core is specifically configured to:

determine, based on the response message, an idle-core list, where the idle-core list includes a core in the idle state in other cores, other than the first core, in the multi-core processor; and select, from the idle-core list, an idle core with minimum overheads for communicating with the first core, as the second core.

Therefore, in this embodiment of the present disclosure, the first core selects the idle core with the minimum overheads for communicating with the first core as the second core, and stores a replaced TLB entry into the second core, thereby reducing communication overheads to a greatest extent. In addition, when the first core needs to query for an entry in the TLB of the second core, because the communication overheads are very low, the first core can quickly find the TLB entry, thereby improving program execution efficiency.

Further, in another implementation of the second aspect, when selecting the idle core with the minimum overheads for communicating with the first core as the second core, the first core is specifically configured to:

use an idle core that is in the idle-core list and that has minimum hops for communication with the first core, as the second core; or use an idle core that is in the idle-core list and that is at a shortest physical distance from the first core, as the second core.

Optionally, in another implementation of the second aspect, after determining the second core, the first core is further configured to record an identifier of the second core in a TLB spare core list of the first core.

Therefore, in this embodiment of the present disclosure, when the TLB entry storage of the first core is full and the first target TLB entry is missing, the first target TLB entry is obtained, the second core is determined, and the second core is recorded into the spare core list of the first core. In this way, based on the spare core list, the first core may read/write the TLB of the second core in the spare core list, thereby increasing the capacity of the TLB of the first core, reducing a TLB miss rate of the first core, and accelerating program execution.

Optionally, in another implementation of the second aspect, the first core is further configured to:

receive a second address translation request, and query the TLB of the first core based on the second address translation request;

when determining that a second target TLB entry corresponding to the second address translation request is missing in the TLB of the first core, query the TLB of the second core; and when finding the second target TLB entry in the TLB of the second core, replace a second entry in the TLB of the first core with the second target TLB entry; and the second core is further configured to store the second entry into the TLB of the second core.

Therefore, in this embodiment of the present disclosure, a working core has permission to read/write a TLB of an idle core. Using a TLB resource in the idle core to save a replaced TLB entry not only increases utilization of the TLB resource of the idle core, but further increases the capacity of the TLB of the first core. When an entry is missing in the TLB of the first core, the target entry may be read from the TLB of the slave core, thereby reducing a possibility of obtaining the target TLB entry by the first core from the memory, accelerating program execution, and improving program execution efficiency.

Optionally, in another implementation of the second aspect, the first core is further configured to:

receive a third address translation request, and query the TLB of the first core based on the third address translation request;

when determining that a third target TLB entry corresponding to the third address translation request is missing in the TLB of the first core, query the TLB of the second core;

when determining that the third target TLB entry is missing in the TLB of the second core, obtain the third target TLB entry;

when determining that entry storage in both the TLB of the first core and the TLB of the second core is full, determine a third core from the cores in the idle state in the multi-core processor; and replace a third entry in the TLB of the first core with the third target TLB entry; and the third core is configured to store the third entry into a TLB of the third core.

Therefore, in this embodiment of the present disclosure, after storage of all current slave cores is full, a new slave core is obtained to save the replaced TLB entry, further expanding the capacity of the first core. When the first core queries for the replaced TLB entry again, the first core can directly read from the new slave core, and the first core does not need to obtain the TLB entry from the memory. Therefore, in this embodiment of the present disclosure, program execution can be accelerated and program execution efficiency can be improved.

Optionally, in another implementation of the second aspect, after the first core switches from a working state to the idle state, the first core is further configured to:

send a TLB release instruction to a core recorded in the TLB spare core list, where the TLB release instruction is used to instruct the core recorded in the spare core list to terminate TLB sharing.

Therefore, in this embodiment of the present disclosure, after the first core switches to the idle state, the first core releases an obtained TLB resource of a slave core by sending a release instruction to all slave cores. In this way, the TLB resource of the slave core (the idle core) is released, avoiding resource waste. Further, the released TLB resource of the slave core can be used by another working core, thereby increasing a capacity of the another working core and accelerating program execution of the working core.

Optionally, in another implementation of the second aspect, after the second core switches from the idle state to a working state, the second core is configured to send a TLB sharing termination request to the first core, where the TLB sharing termination request carries the identifier of the second core; and the first core is further configured to: receive the TLB sharing termination request, and delete the identifier of the second core from the TLB spare core list.

Therefore, in this embodiment of the present disclosure, after the second core switches from the idle state to the working state, the second core sends the TLB sharing termination request to the first core, so that the first core releases the second core, and the second core can use the TLB resource of the second core. This avoids an impact on ongoing service processing in the second core. In addition, the second core may also become another master core and can use a TLB resource of another idle core.

Optionally, in another implementation of the second aspect, the first core is further configured to determine a fourth core from the cores in the idle state in the multi-core processor, where a TLB of the fourth core is used to store all entries in the TLB of the second core.

Therefore, in this embodiment of the present disclosure, the first core obtains a new slave core (the fourth core) to save all entries in the TLB of the released second core. If the first core needs to query for an entry in the second core in a subsequent query, the first core does not need to re-obtain the entry from the memory by using the operating system. Instead, the first core can directly access the TLB of the slave core (the fourth core) to obtain the entry. This greatly reduces a TLB refilling delay and accelerates program execution.

BRIEF DESCRIPTION OF DRAWINGS

To describe the technical solutions in the embodiments of the present disclosure more clearly, the following briefly describes the accompanying drawings required for describing the embodiments.

FIG. 2 is a schematic flowchart of a translation lookaside buffer TLB management method according to an embodiment of the present disclosure;

FIG. 3 is a schematic diagram of a spare core list vector according to an embodiment of the present disclosure;

DESCRIPTION OF EMBODIMENTS

Figure 1:
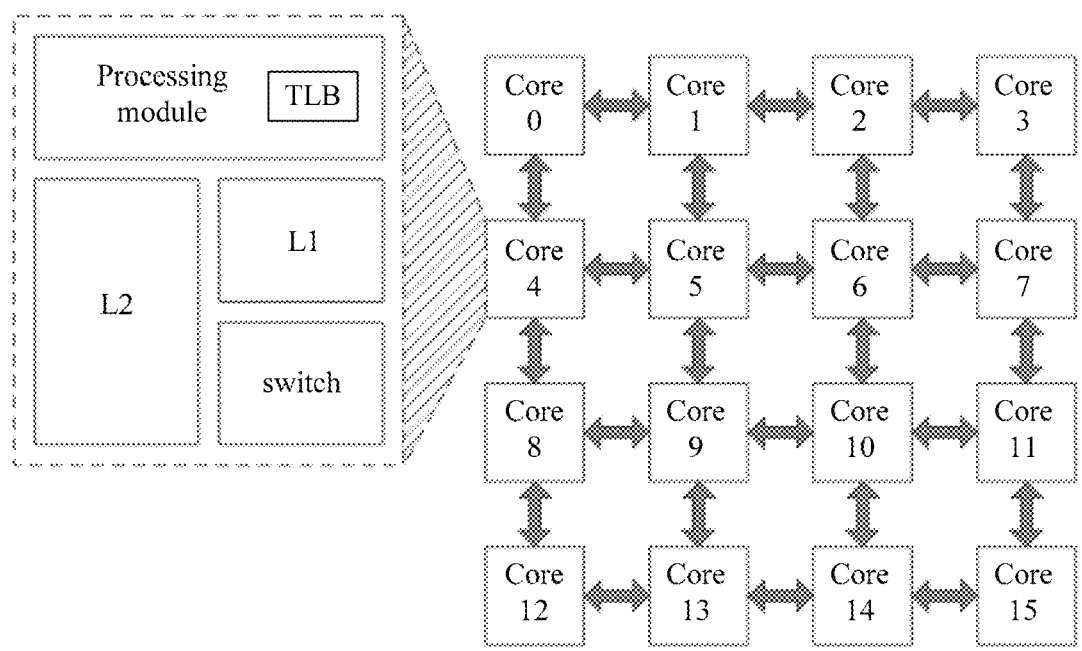
FIG. 1 is a schematic structural diagram of a multi-core processor according to an embodiment of the present disclosure.

The following clearly and completely describes the technical solutions in the embodiments of the present disclosure with reference to the accompanying drawings in the embodiments of the present disclosure. Apparently, the described embodiments are a part rather than all of the embodiments of the present disclosure.

The technical solutions of the present disclosure may be applied to a hardware device such as a CPU, a memory management unit (MMU), and a memory, and the hardware device may run on an operating system that implements service processing by using a thread or a process (including a plurality of threads), such as the Linux system, the Unix system, the Windows system, the Android system, or the iOS system.

It should be understood that the real-time operating systems enumerated above are merely examples for description. The present disclosure does not specifically limit the operating system, provided that the hardware device in the embodiments of the present disclosure has a multi-core processor. The embodiments of the present disclosure are not limited thereto.

For easy understand of the embodiments of the present disclosure, some terms in descriptions of the embodiments of the present disclosure are first defined as follows:

In the embodiments of the present disclosure, the term "multi-core processor" means a processor that includes a plurality of processor cores, and may be specifically represented as a chip multi-processor, or a multiprocessor system-on-board. The chip multi-processor is a processor in which a plurality of processor cores are interconnected and integrated on a chip by using a network on chip (NOC). The multiprocessor system-on-board is a processing system built by packaging each of a plurality of processor cores as a processor and integrating all processors on a circuit board.

In the embodiments of the present disclosure, the term "processor core", also called a kernel or a core, is a most important component of a Central Processing Unit (CPU). The processor core is made from monocrystalline silicon by using a specific production process, and performs all computations, command reception or command storage, and data processing for the CPU. In the term, "a plurality of processor cores" means that at least two processor cores are included, and the "a plurality of processor cores" covers an application scope of a multi-core and a many-core in the prior art.

In the embodiments of the present disclosure, a TLB, also known as a page table cache, stores some page table files, that is, entries for translating a virtual address to a physical address. The TLB may be used for interaction between a virtual address and a physical address, and provides a buffer for searching for the physical address, to effectively reduce time consumed for searching for the physical address by a core.

In the embodiments of the present disclosure, a "master core (Master)" indicates a core that is in a working state and that can use a TLB resource of another idle core to manage a TLB entry. A "slave core (Slave)" indicates a core that is in an idle state and that can share a TLB resource of the slave core with the master core.

In the embodiments of the present disclosure, "TLB miss" indicates that a TLB entry corresponding to an address translation request does not exist in a TLB of a core. "TLB hit" indicates that a TLB entry corresponding to an address translation request exists in a TLB of a core.

Figure 6:
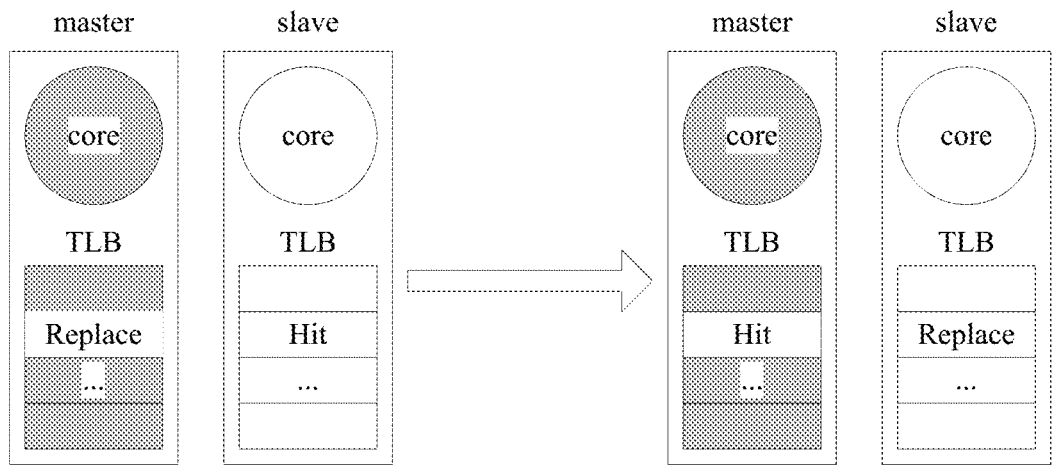
FIG. 6 is a schematic diagram of a translation lookaside buffer TLB management method according to another embodiment of the present disclosure.

"TLB replace" indicates that a TLB entry in the master core exchanges position with a TLB entry corresponding to an address translation request in the slave core. For example, as shown in FIG. 6, a TLB entry corresponding to an address translation request in a slave core, namely, a "hit" TLB entry in a TLB of the slave core exchanges position with a "replace" TLB entry in a TLB of a master core.

It should be further understood that, in the embodiments of the present disclosure, first, second, third, and fourth are only for distinguishing between cores, and should not constitute any limitation on the protection scope of the present disclosure. For example, a first core may also be called a second core, and a second core may also be called a first core.

It should be noted that in the embodiments of the present disclosure, depending on a change of an actual situation, a fourth core and a second core or a third core may be a same core or different cores. This is not limited in the embodiments of the present disclosure.

In a multi-core system, usually a relatively large quantity of processor cores are used to improve parallel processing performance. However, in an application program, some parts are of a relatively low parallelism, and therefore some processor cores in the system have no task to execute and become idle cores (or cores in an idle state or idle nodes). In the embodiments of the present disclosure, a TLB resource in an idle core is dynamically allocated to a working core (or a core in a working state or a working node) executing a task, to expand a TLB capacity of the working core, reduce TLB miss, and ultimately accelerate program execution. The working core may obtain TLB resources of one or more idle cores to meet a TLB access requirement of the working core. Herein, the working core that obtains the TLB resource is called a master core (Master), and the idle core that provides the TLB resource is called a slave core (Slave). During a TLB resource using process, a TLB entry frequently accessed is located in the master core, and a TLB entry infrequently accessed is located in the slave core.

It should be understood that in the embodiments of the present disclosure, a "core" included in the multi-core processor may also be called a "node", that is, the "node" in this specification may be equivalent to the "core" in the multi-core processor. In the embodiments of the present disclosure, the multi-core processor includes a plurality of cores, or in other words, the multi-core processor includes a plurality of nodes. This is not limited in the embodiments of the present disclosure.

It should be understood that in the embodiments of the present disclosure, the multi-core processor may include at least two cores. For example, the multi-core processor may include 2 cores, 4 cores, 8 cores, 16 cores, or 32 cores. The embodiments of the present disclosure are not limited thereto. The following describes a basic structure of a multi-core processor according to an embodiment of the present disclosure with reference to FIG. 1.

The multi-core processor shown in FIG. 1 includes 16 cores (Core): Core 0 to Core 15. Each core includes:
a processing module;
a caching module, where, for example, the caching module includes a level 1 cache (L1) and a level 2 cache (L2); and
a network-on-chip interface (Switch).

The processing module of each core includes a TLB. The cores are connected to each other by using a network on chip and communicate with each other by using the network-on-chip interface. Communication between two horizontally or vertically adjacent cores by using a link between the two cores may be called a hop. For example, a communication path for communication between Core 1 and Core 3 requires at least two hops, that is, Core 1-Core 2-Core 3.

The following describes in detail a TLB management method according to the embodiments of the present disclosure with reference to FIG. 2 to FIG. 10.

FIG. 2 is a schematic flowchart of a TLB management method according to an embodiment of the present disclosure. The method shown in FIG. 2 may be performed by a first core. Specifically, a method 200 shown in FIG. 2 is applied to a multi-core processor, where the multi-core processor includes a first core, and the first core includes a TLB. It should be understood that the first core may be any core of the multi-core processor. For example, for the multi-core processor shown in FIG. 1, the first core may be any one of Core 0 to Core 15. This is not limited in this embodiment of the present disclosure. Specifically, the method 200 shown in FIG. 2 includes the following steps.

210: The first core receives a first address translation request, and queries the TLB of the first core based on the first address translation request.

In other words, after receiving the first address translation request, the first core queries whether there is a TLB entry corresponding to the first address translation request in the TLB of the first core.

220: When determining that a first target TLB entry corresponding to the first address translation request is missing in the TLB of the first core, the first core obtains the first target TLB entry.

Specifically, the first core may obtain the first target TLB entry from another core of the multi-core processor. For example, the first core may broadcast a TLB query request to other cores of a multi-core system, where the broadcast TLB query request carries a virtual address causing a miss, that is, a virtual address corresponding to the first target TLB entry. After receiving the broadcast address, the other cores search local TLBs for the virtual address. If a TLB of a processor core is hit, the first target TLB entry may be fed back to the first core.

In this way, the first core can rapidly obtain the first target TLB entry from the another core, thereby avoiding that the first core sends a query request to an operating system to obtain the first target TLB entry from a memory. This can save time and improve application efficiency.

In addition, the first core may also obtain the first target TLB entry from a page table of the memory. For example, the first core sends the query request to the operating system, where the query request carries the virtual address causing the miss, and obtains the first target TLB entry from the page table of the memory after processing of the operating system. This is not limited in this embodiment of the present disclosure.

230: When determining that entry storage in the TLB of the first core is full, the first core determines a second core from cores in an idle state in the multi-core processor.

In other words, when a TLB miss (Miss) occurs in the first core (or a working core or a working node) and entry storage in the local TLB is full, to store the obtained first target TLB entry, the first core needs to replace a valid TLB entry with the first target TLB entry. In this case, the first core attempts to obtain more TLB resources to save the replaced TLB entry. Therefore, the first core needs to determine the second core from the idle cores.

Therefore, in this embodiment of the present disclosure, the replaced TLB entry is stored by using a TLB resource in the idle core. This not only increases utilization of the TLB resource of the idle core, but also indirectly increases a capacity of the TLB of the first core, reduces a possibility of obtaining the target TLB entry by the first core from the memory, and accelerates program execution.

Specifically, in another embodiment, that the first core determines a second core from cores in an idle state in the multi-core processor includes:

sending, by the first core, a status query request to each of other cores in the multi-core processor, where the status query request is used to query whether each core is in the idle state;

receiving, by the first core, a response message sent by each of the other cores, where the response message is used to indicate whether each core is in the idle state; and selecting, by the first core based on the response message, a core from the cores in the idle state as the second core.

Further, the selecting, by the first core based on the response message, a core from the cores in the idle state as the second core includes:

determining, by the first core based on the response message, an idle-core list, where the idle-core list includes a core in the idle state in other cores, other than the first core, in the multi-core processor; and selecting, from the idle-core list, an idle core with minimum overheads for communicating with the first core, as the second core.

Therefore, in this embodiment of the present disclosure, the first core selects the idle core with the minimum overheads for communicating with the first core as the second core, and stores a replaced TLB entry into the second core, thereby reducing communication overheads to a greatest extent. In addition, when the first core needs to query for an entry in the TLB of the second core, because the communication overheads are very low, the first core can quickly find the TLB entry, thereby improving program execution efficiency.

A person skilled in the art may understand that selecting the second core based on the minimum overheads for communicating with the first core is a relatively ideal selection manner. In specific implementation, the communication overheads need to be determined based on a congestion level of a network on chip NoC (Network on Chip) router in a multi-core processor chip, and a processor core is selected from idle cores as the second core based on the network congestion level. To simplify a second core selection process, the following implementations may be used:

(1) using, by the first core, an idle core that is in the idle-core list and that has minimum hops for communication with the first core, as the second core; or (2) using, by the first core, an idle core that is in the idle-core list and that is at a shortest physical distance from the first core, as the second core.

In this embodiment of the present disclosure, another manner may also be used to determine the core with the minimum communication overheads. This is not limited in this embodiment of the present disclosure.

For example, the multi-core processor in FIG. 1 is used as an example. For the implementation (1), it is assumed that the first core is Core 5, and the idle cores included in the idle-core list are Core 7, Core 11 and Core 14. Minimum hops for communication between Core 5 and Core 7 are two hops, that is, a communication path is Core 5-Core 6-Core 7; minimum hops for communication between Core 5 and Core 11 are three hops, for example, one of communication paths with the minimum hops is Core 5-Core 6-Core 7-Core 11; and minimum hops for communication between Core 5 and Core 14 are three hops, for example, one of communication paths with the minimum hops is Core 5-Core 9-Core 13-Core 14. Therefore, Core 5 selects Core 7 that has the minimum hops for communication with Core 5 as the second core.

For the implementation (2), it can be learned from multi-core processor distribution in FIG. 1 that because among Core 7, Core 11, and Core 14, a core that is at a shortest distance from Core 5 is Core 7, Core 5 selects Core 7 as the second core.

Specifically, the first core (which may be called a requesting node herein) broadcasts a status query request (also called a TLB query request) to other cores (also called other nodes) in the multi-core processor, where the status query request is used to query whether each core is in an idle state. After receiving the status query request, each core sends a response message to the first core (the requesting node), where the response message is used to indicate whether the core is in the idle state. In this way, the first core obtains the idle-core list based on the response message. If the idle-core list is blank, TLB resource obtaining is terminated, and a missing TLB entry (that is, the first target TLB entry) of the first core is read from the memory in an existing manner. If the idle-core list is not blank, TLB resource obtaining is performed. To be specific, the first core selects, based on overheads for communicating with idle cores in the idle-core list, an idle core with the minimum communication overheads, and sends a TLB sharing request to the idle core. If the idle core has been shared by another node or the idle core switches to a working state in this case, the idle core sends a failure feedback to the requesting node, so that the idle core is deleted from the idle-node list. Then, the foregoing process is repeated. If the idle core is in the idle state in this case, the idle core is determined as the second core.

Therefore, in this embodiment of the present disclosure, the first core selects the idle core with the minimum overheads for communicating with the first core as the second core, and stores a replaced TLB entry into the second core, thereby reducing communication overheads to a greatest extent. In addition, when the first core needs to query for an entry in the TLB of the second core, because the communication overheads are very low, the first core can quickly find the TLB entry, thereby improving program execution efficiency.

240: The first core replaces a first entry in the TLB of the first core with the first target TLB entry, and stores the first entry into a TLB of the second core.

For example, the first core replaces the first entry at a first entry position in the TLB of the first core with the first target TLB entry, and stores the first entry into the TLB of the second core.

It should be understood that the first entry position may be any entry position in a TLB of a master core. This is not limited in this embodiment of the present disclosure. In other words, the first entry may be any TLB entry in the TLB of the first core. For example, the first entry may be a first entry, a last entry, or an intermediate entry in the TLB of the first core. This is not limited in this embodiment of the present disclosure.

In other words, when the entry storage in the TLB of the first core is full and the first target TLB entry is missing, the first core needs to store the first target TLB entry at the first entry position in the TLB of the first core, and store the first entry that is replaced from the first entry position into the TLB of the second core.

In this embodiment of the present disclosure, the first core may be called a master core of the second core, and the second core may be called a slave core (or a spare core) of the first core.

It should be understood that the master core (Master) writes a TLB entry into the TLB of the slave core (Slave). This process occurs when the TLB entry in the master is replaced. As shown in FIG. 2, after the master obtains the first target TLB entry, because the TLB entry storage of the master core is full, the first target TLB entry needs to be filled to the first entry position. To be specific, the first entry at the first entry position is replaced with the first target TLB entry, and then the first entry is stored into the TLB of the slave core (Slave) (for example, the second core).

In a process in which the replaced entry is written into the TLB of the slave, the slave saves a write position. In this embodiment of the present disclosure, an alternate write mechanism may be used. That is, if a quantity of TLB entries of the slave core is N, writing starts sequentially from a first entry to an $(N-1)^{th}$ entry, that is, starts from 0 until the entry storage is full. A TLB processing method used when the entry storage of the slave core (for example, the second core) is full is described in detail in the following.

In this embodiment of the present disclosure, when the entry storage in the TLB of the first core is full and the first target TLB entry is missing, the first target TLB entry is obtained to replace the first entry in the TLB of the first core, and the first entry is stored into the TLB of the second core, that is, the replaced entry is stored into the TLB of the second core. Therefore, in this embodiment of the present disclosure, a TLB resource of an idle core is used to expand a TLB capacity of a working core, thereby reducing a TLB miss rate and accelerating program execution.

Because the working core, namely the master core (Master) (for example, the first core), writes the replaced TLB entry into the TLB of the idle node, namely the slave core (Slave) (for example, the second core), when the working core needs to use the replaced TLB entry again, the working core does not need to obtain the entry again by using the operating system, but can obtain the entry by directly accessing the TLB of the slave. This greatly reduces a TLB refilling delay and accelerates program execution.

It should be noted that in this embodiment of the present disclosure, an idle core can share a TLB resource of the idle core with only one working core for use, and the working core may obtain TLB resources of a plurality of idle cores to store TLB entries.

Optionally, in another embodiment, after the second core is determined, the method may further include:

recording an identifier of the second core in a TLB spare core list of the first core.

The spare core list herein may also be called a slave core list.

Therefore, in this embodiment of the present disclosure, when the TLB entry storage of the first core is full and the first target TLB entry is missing, the first target TLB entry is obtained, the second core is determined, and the second core is recorded into the spare core list of the first core. In this way, based on the spare core list, the first core may read/write the TLB of the second core in the spare core list, thereby increasing the capacity of the TLB of the first core, reducing a TLB miss rate of the first core, and accelerating program execution.

After the first core determines the second core from the idle-core list, the second core becomes the slave core (Slave) (also called a spare core) of the first core. The slave core (the second core) writes an identifier (for example, a number) of the first core into a master core (Master) number register of the slave core. The first core becomes the master core (Master) of the second core, and adds an identifier (for example, a number) of the slave core (the second core) to the spare core list of the first core.

For example, in this embodiment of the present disclosure, identifiers of all slave cores may be recorded in the spare core list. Alternatively, in this embodiment of the present disclosure, all slaves of a current master may be recorded by using a vector. For example, as shown in FIG. 3, a multi-core processor has a total of four cores. Then a vector recorded in the spare core list may include four bits, and a first bit to a fourth bit respectively represent a first core to a fourth core, that is, Core 0 to Core 3. For example, in this embodiment of the present disclosure, the first core may be Core 3 in FIG. 3, and a vector indicating the spare core list of the first core may be 0100, where 0 indicates that a core is not a slave core of the first core, and 1 indicates that a core is a slave core of the first core. Then it can be learned from the spare core list vector that a second core of the four cores is the slave core of the first core.

Figure 4:
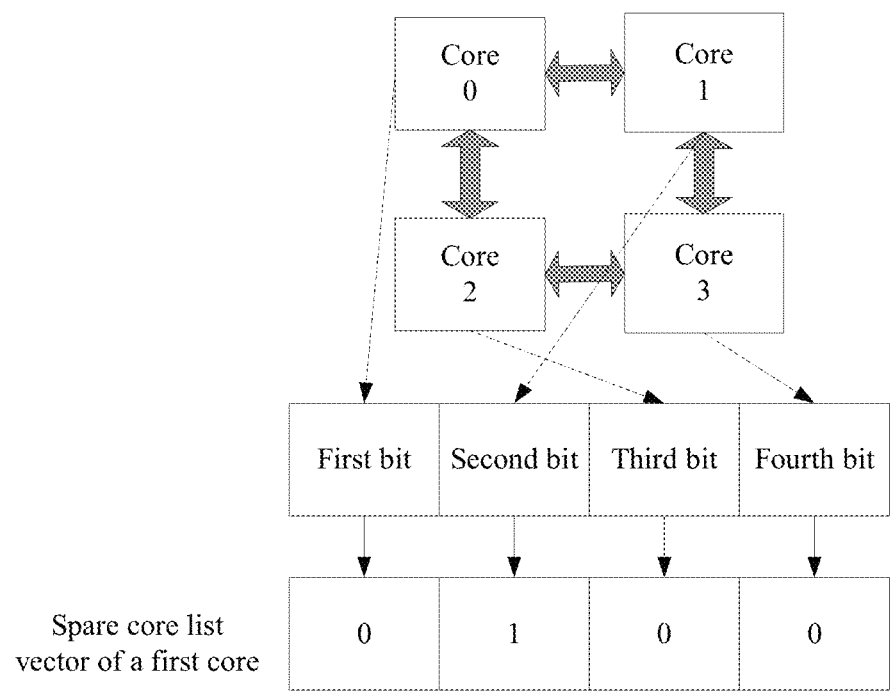
FIG. 4 is a schematic diagram of a spare core list vector according to another embodiment of the present disclosure.

For another example, as shown in FIG. 4, for the multi-core processor in FIG. 1, the spare core list may be a 16-bit vector, and 16 bits from left to right represent Core 0 to Core 15, respectively. If the first core is Core 5, a spare core list vector of the first core may be, for example, 0000001000000000. Because a 7th bit is 1, a core corresponding to the $7^{th}$ bit, Core 6, is a slave core of Core 5.

In actual application, after the master core obtains the address translation request, if a local TLB entry of the master core is missing, the master core reads a TLB entry from a slave core. The following describes a specific process in which the master core reads the TLB entry from the slave core. Correspondingly, in another embodiment, after the first core determines the second core from the cores in the idle state in the multi-core processor, the method may further include:

receiving, by the first core, a second address translation request, and querying the TLB of the first core based on the second address translation request;

when determining that a second target TLB entry corresponding to the second address translation request is missing in the TLB of the first core, querying, by the first core, the TLB of the second core; and when finding the second target TLB entry in the TLB of the second core, replacing a second entry in the TLB of the first core with the second target TLB entry, and storing the second entry into the TLB of the second core.

For example, the first core stores the second entry at an original position of the second target TLB entry in the second core. That is, the first core exchanges storage positions of the second entry and the second target TLB entry.

It should be understood that this embodiment is described by using only an example in which the first core reads the second target entry in the TLB of the second core. When the first core has a plurality of slave cores, the first core may send, to all the slave cores, a request for reading the second target entry. The second target entry may be located in a TLB of another slave core, and a corresponding process of entry reading and entry replacement is the same as that described above. Details are not described herein again.

Figure 5:
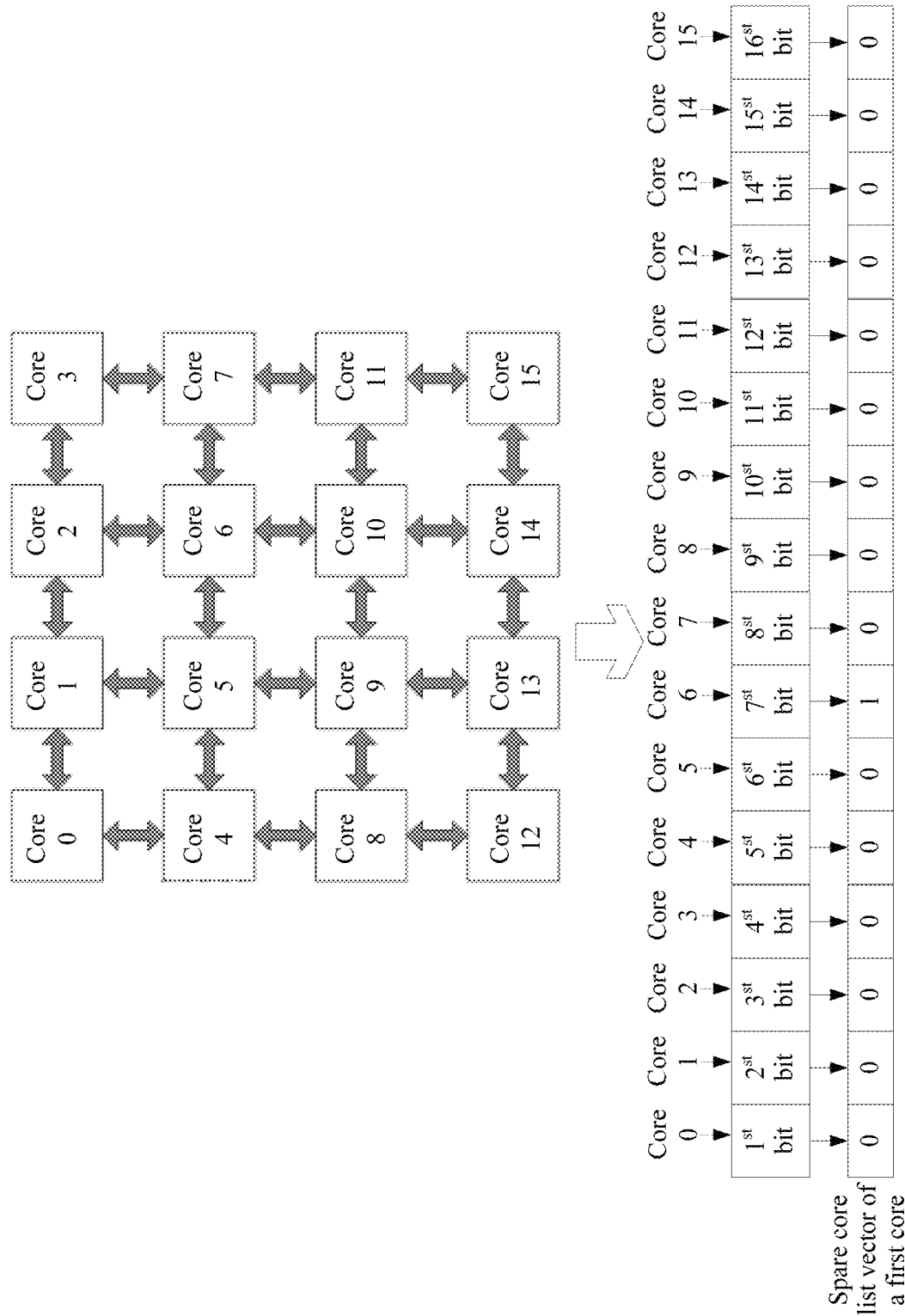
FIG. 5 is a schematic diagram of a translation lookaside buffer TLB management method according to an embodiment of the present disclosure.

The foregoing process occurs when a local TLB miss (Miss) occurs in the master (the first core), that is, the second target TLB entry does not exist in the local TLB. The master reads the TLB entry from the slave. For example, as shown in FIG. 5, the master sends a TLB read request to all slaves based on the spare core list (Slave List) (also called a slave core list). After receiving the TLB read request, each slave queries a local TLB of the slave core. If the second target TLB is missed, a miss feedback is returned; if the second target TLB is hit, a hit feedback and content of a hit TLB entry are returned. After the master collects all feedbacks, if the feedbacks are all miss feedbacks, the master sends a TLB query request to the operating system, to obtain the missing TLB entry from the memory; if a TLB entry in the slave is hit, the master uses the hit TLB entry for refilling. If entry replacement occurs during a refilling process, a replaced entry is written into the hit slave core.

Therefore, in this embodiment of the present disclosure, a working core has permission to read/write a TLB of an idle core. Using a TLB resource in the idle core to save a replaced TLB entry not only increases utilization of the TLB resource of the idle core, but further increases the capacity of the TLB of the first core. When an entry is missing in the TLB of the first core, the target entry may be read from the TLB of the slave core, thereby reducing a possibility of obtaining the target TLB entry by the first core from the memory, accelerating program execution, and improving program execution efficiency.

As described in the foregoing, in a process in which the replaced entry is written into the TLB of the slave, the slave saves a write position. In this embodiment of the present disclosure, an alternate write mechanism may be used. That is, if a quantity of TLB entries of the slave core (for example, the second core) is N, writing starts sequentially from a first entry, that is, from 0, to an $(N-1)^{th}$ entry.

When a TLB entry is written into an $(N-1)^{th}$ position, that is, entry storage of the TLB of the slave core is full, it indicates that all entries stored in the TLB of the slave core are replaced entries of the master. In this case, the slave core may be called a full slave core (Full Slave). The full slave is unable to save another replaced entry, and sends a write overflow request to the master. After receiving the request, the master records the full slave into a full slave list.

In this case, when the master has an entry replaced, the master needs to obtain another slave core to store the replaced entry.

In other words, when a valid TLB entry in the master is replaced and all slaves in the spare core list are full slaves, because entries stored in TLBs of all full slaves are replaced entries of the master, and the entries may be subsequently used by the master, the master expects to obtain more slaves to save a replaced entry.

Correspondingly, in another embodiment, the method may further include:

receiving, by the first core, a third address translation request, and querying the TLB of the first core based on the third address translation request;

when determining that a third target TLB entry corresponding to the third address translation request is missing in the TLB of the first core, querying, by the first core, the TLB of the second core;

when determining that the third target TLB entry is missing in the TLB of the second core, obtaining the third target TLB entry;

when determining that entry storage in both the TLB of the first core and the TLB of the second core is full, determining, by the first core, a third core from the cores in the idle state in the multi-core processor; and replacing, by the first core, a third entry in the TLB of the first core with the third target TLB entry, and storing the third entry into a TLB of the third core.

Therefore, in this embodiment of the present disclosure, after storage of all current slave cores is full, a new slave core is obtained to save the replaced TLB entry, further expanding the capacity of the first core. When the first core queries for the replaced TLB entry again, the first core can directly read from the new slave core, and the first core does not need to obtain the TLB entry from the memory. Therefore, in this embodiment of the present disclosure, program execution can be accelerated and program execution efficiency can be improved.

Specifically, when entry storage in the TLB of the master core (the first core) is full and entry storage in TLBs of all slave cores (in this example, there is only one slave core, namely the second core) of the master core is full, the master core (the first core) determines the third core from other idle cores in the multi-core processor to store the third entry that is in the TLB of the first core and that is replaced with the third target TLB entry.

For a process of determining the third core, refer to the process of determining the second core. Details are not described herein again.

Figure 7:
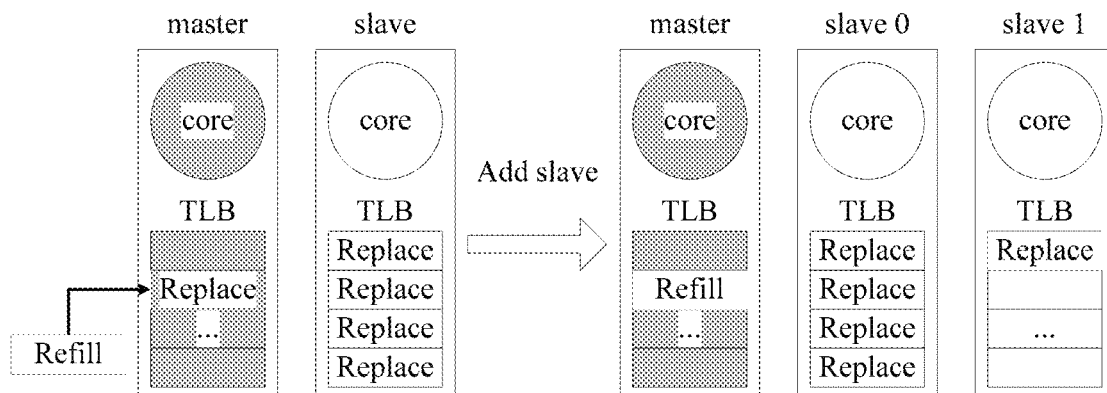
FIG. 7 is a schematic diagram of a translation lookaside buffer TLB management method according to another embodiment of the present disclosure.

For example, as shown in FIG. 7, when existing slaves of a master are all full slaves, if a replaced entry is still written into a TLB of a full slave, a previously replaced entry will be overwritten. To avoid such a situation, the master repeats a slave obtaining process described in the foregoing to obtain a new slave 1 (for example, the third core) in the figure, and writes the replaced entry (for example, the third entry) into the slave 1.

The foregoing describes a solution in which the master core determines the slave core and uses a resource of the slave core to store a TLB entry. After the master core switches from the working state to the idle state, because the master core does not need to use the TLB resource any longer, the master core needs to release the obtained resource of the slave core.

Correspondingly, in another embodiment, after the first core switches from the working state to the idle state, the method further includes:

sending, by the first core, a TLB release instruction to a core recorded in the TLB spare core list, where the TLB release instruction is used to instruct the core recorded in the spare core list to terminate TLB sharing.

Figure 8:
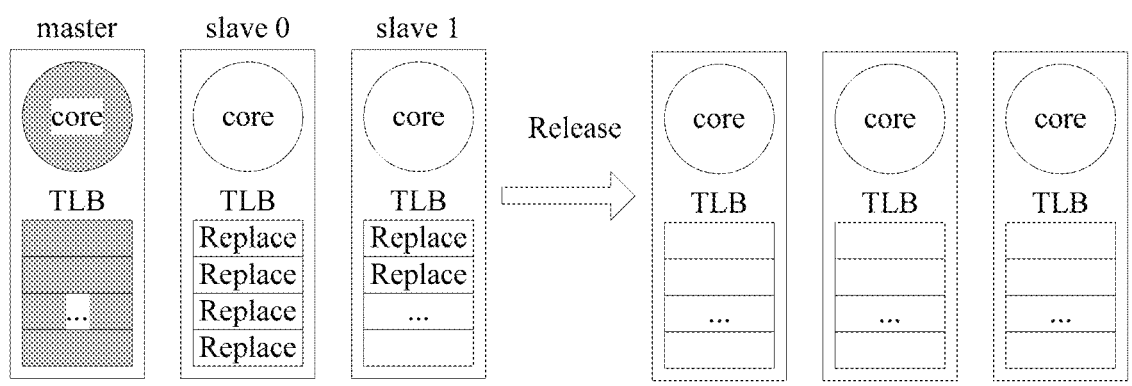
FIG. 8 is a schematic diagram of a translation lookaside buffer TLB management method according to another embodiment of the present disclosure.

In other words, when the master changes to the idle state, all obtained TLB resources are released. The master sends the TLB release request to all slaves based on the slave list, so that TLB resources of these idle cores can be used by another working core. For example, as shown in FIG. 8, after the master releases all obtained TLB resources, the master and the slaves all become idle cores, and can be used by another working core.

Therefore, in this embodiment of the present disclosure, after the first core switches to the idle state, the first core releases an obtained TLB resource of a slave core by sending a release instruction to all slave cores. In this way, the TLB resource of the slave core (the idle core) is released, avoiding resource waste. Further, the released TLB resource of the slave core can be used by another working core, thereby increasing a capacity of the another working core and accelerating program execution of the working core.

After the slave core terminates TLB sharing, the slave core may or may not delete the TLB entry stored in the slave core. This is not limited in this embodiment of the present disclosure. For example, after sharing is terminated and the slave core serves as a slave core of another working core, all entries in the TLB may be deleted, so that the another core can store a replaced entry. For another example, after sharing is terminated and when the slave core is in the working state, a previously stored TLB entry may be reserved for searching and use by the slave core itself.

Figure 9:
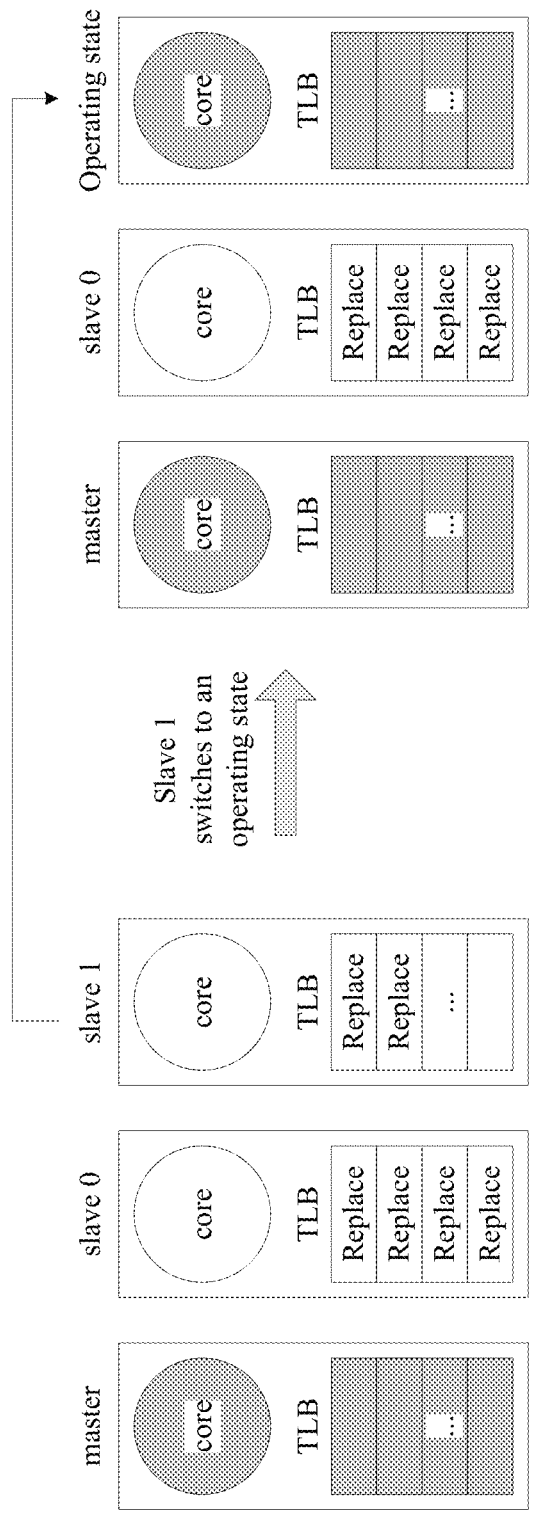
FIG. 9 is a schematic diagram of a translation lookaside buffer TLB management method according to another embodiment of the present disclosure.

Likewise, when the slave (for example, the second core) changes to an operating state, the slave sends a TLB sharing termination request to the master, and the master deletes the slave from the slave list after receiving the request. For example, as shown in FIG. 9, after slave 1 changes to the operating state, the master core releases slave 1 and deletes slave 1 from the slave core list.

Correspondingly, in another embodiment, after the second core switches from the idle state to the working state, the method further includes:

receiving, by the first core, a TLB sharing termination request sent by the second core, where the TLB sharing termination request carries the identifier of the second core; and deleting, by the first core, the identifier of the second core from the TLB spare core list.

Therefore, in this embodiment of the present disclosure, after the second core switches from the idle state to the working state, the second core sends the TLB sharing termination request to the first core, so that the first core releases the second core, and the second core can use the TLB resource of the second core. This avoids an impact on ongoing service processing in the second core. In addition, the second core may also become another master core and can use a TLB resource of another idle core.

Further, in another embodiment, before the deleting, by the first core, the identifier of the second core from the TLB spare core list, the method further includes:

determining, by the first core, a fourth core from the cores in the idle state in the multi-core processor; and copying, by the first core, all entries from the TLB of the second core to a TLB of the fourth core.

In other words, before the master core (for example, the first core) deletes the slave core (for example, the second core) from the spare core list, the master core obtains a new core (a new slave core) from the multi-core processor. A TLB of the new slave core is used to store all entries in the TLB of the deleted slave core (that is, the second core). In this way, if an entry in the second core needs to be queried in a subsequent query, the entry does not need to be obtained again by using the operating system, and the entry can be obtained by directly accessing the TLB of the slave core (the fourth core). This greatly reduces a TLB refilling delay and accelerates program execution.

For a process of determining the fourth core, refer to the process of determining the second core. Details are not described herein again.

Figure 10:
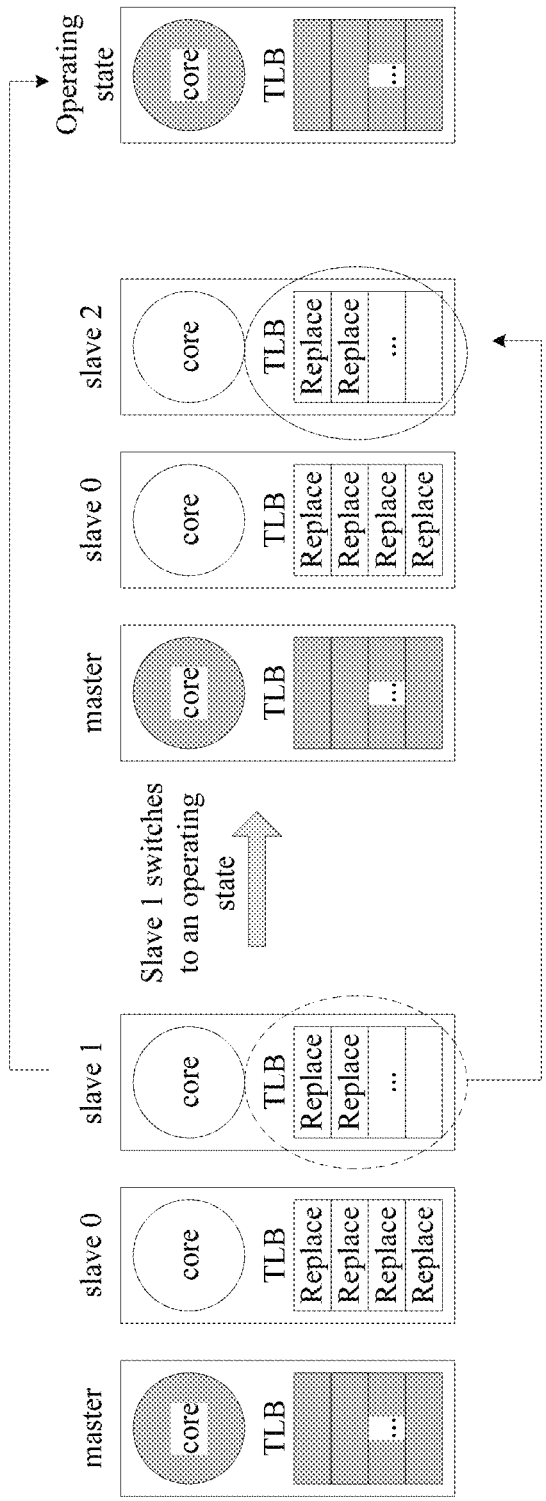
FIG. 10 is a schematic diagram of a translation lookaside buffer TLB management method according to another embodiment of the present disclosure.

For example, as shown in FIG. 10, after slave 1 changes to the operating state, the master core releases slave 1 and deletes slave 1 from the slave core list. In addition, the master core determines a new slave core, for example, slave 2, stores all entries in a TLB of slave 1 into a TLB of slave 2, and records slave 2 into the slave core list.

Therefore, in this embodiment of the present disclosure, the first core obtains a new slave core (the fourth core) to save all entries in the TLB of the released second core. If the first core needs to query for an entry in the second core in a subsequent query, the first core does not need to re-obtain the entry from the memory by using the operating system. Instead, the first core can directly access the TLB of the slave core (the fourth core) to obtain the entry. This greatly reduces a TLB refilling delay and accelerates program execution.

It should be noted that in this embodiment of the present disclosure, a flag register is configured for each core of the multi-core processor, where the flag register is used to record a status flag, a master core (Master) flag, and a slave core (Slave) flag of the core.

The status flag is used to indicate an operating status and a sharing status of the core. The operating status includes an idle state or a working state. The sharing status includes a master core state, a slave core state, or a no-sharing state. The master core state indicates that the core is in the working state and uses a TLB resource of another idle core to manage a TLB entry, and the slave core state indicates that the core is in the idle state and shares a TLB resource with the master core.

The master core flag is used to indicate an idle-core list, a slave core (Slave) list (also called a spare core list), and a full slave core (Full Slave) list when the core is the master core. The idle-core list is used to indicate a vector of all idle cores, the slave core list is used to indicate a vector of all slave cores of the core, and the full slave core list is used to indicate a vector of all full slave cores of the core.

The slave core flag is used to indicate a master core (Master) number and a write position of a replaced entry when the core is the slave core. The master core number includes an identifier of a unique master core of the core, and the write position of the replaced entry includes a write position of the replaced entry of the master core in the slave core.

Specifically, to implement a TLB resource sharing method proposed in the present disclosure, some registers need to be added to each node to save a flag, including the status flag, the master flag, and the slave flag. Because each node may become a master or a slave, the three flags are configured for each node. For example, see Table 1.

TABLE 1

Description of flags in each node

| Type | Name | Bit Width | Description |
| --- | --- | --- | --- |
| Status flag | Operating status | 1 | 0: Idle node; 1: Working node |
| | Sharing status | 2 | 00: No sharing; 01: Master; 10: Slave |
| Master flag | Idle-node list | Quantity of nodes | This flag records idle nodes in a system by using a vector. 0 indicates working, and 1 indicates idle. |
| | Slave list | Quantity of nodes | This flag records all slaves of a current master by using a vector. 0 indicates non-slave, and 1 indicates slave. |
| | Full slave list | Quantity of nodes | This flag records all full slaves of a current master by using a vector. 0 indicates non-full slave, and 1 indicates full slave. |
| Slave flag | Master number | $\lceil \log_2(\text{Quantity of nodes}) \rceil$ | This flag records a unique master number corresponding to a slave. |
| | Write position | $\lceil \log_2(\text{Quantity of TLB entries}) \rceil$ | This flag records a write position of a replaced entry of a master in a slave TLB. |

The following describes each flag in detail.

Operating status flag: distinguishes between an idle node and a working node. Therefore, only a 1-bit register may be needed.

Sharing status flag: distinguishes between a master node, a slave node, and a no-sharing node. Therefore, a 2-bit register may be needed.

Idle node/slave/full slave list: A function of each list has been described in detail above. In a register, a vector is used for implementation, where a width of the vector is equal to a quantity of nodes in a system, and each bit of the vector corresponds to one node. For example, for a slave list, a bit 0 in the vector indicates that a corresponding node is not a slave, while a bit 1 indicates that a corresponding node is a slave.

Master number: A slave can only have a unique master. For the slave, a master number records a number of a master of the slave. When the slave changes to an operating state, the slave may inform the corresponding master based on the master number. A binary bit width of the master number may be $\lceil \log_2 (\text{Quantity of nodes}) \rceil$, that is, a minimal integer greater than or equal to $\log_2$ (Quantity of nodes). For example, when a multi-core processor includes eight cores (eight nodes), it indicates that the master number needs $\lceil \log_2 (8) \rceil$ bits, that is, three bits. For another example, when a multi-core processor includes 12 cores (12 nodes), it indicates that the master number needs $\lceil \log_2 (12) \rceil$ bits, that is, 4 bits.

Write position: is maintained by a slave and indicates a write position of a replaced entry received from a master. A binary bit width of the write position may be $\lceil \log_2 (\text{Quantity of TLB entries}) \rceil$, that is, a minimal integer greater than or equal to $\log_2$ (Quantity of TLB entries). For example, when there are 64 entries in a TBL of a slave, it indicates that the write position needs $\lceil \log_2 (64) \rceil$ bits, that is, 6 bits.

Therefore, in this embodiment of the present disclosure, setting of a flag enables a master core to read/write a TLB resource of a slave core, which expands a capacity of a TLB of the master core, and also reduces a possibility of obtaining the target TLB entry by the first core from the memory. This can accelerate program execution and improve program execution efficiency.

The foregoing describes in detail the TLB management method according to the embodiments of the present disclosure with reference to FIG. 1 to FIG. 10. The following describes in detail a multi-core processor according to an embodiment of the present disclosure with reference to FIG. 11.

Figure 11:
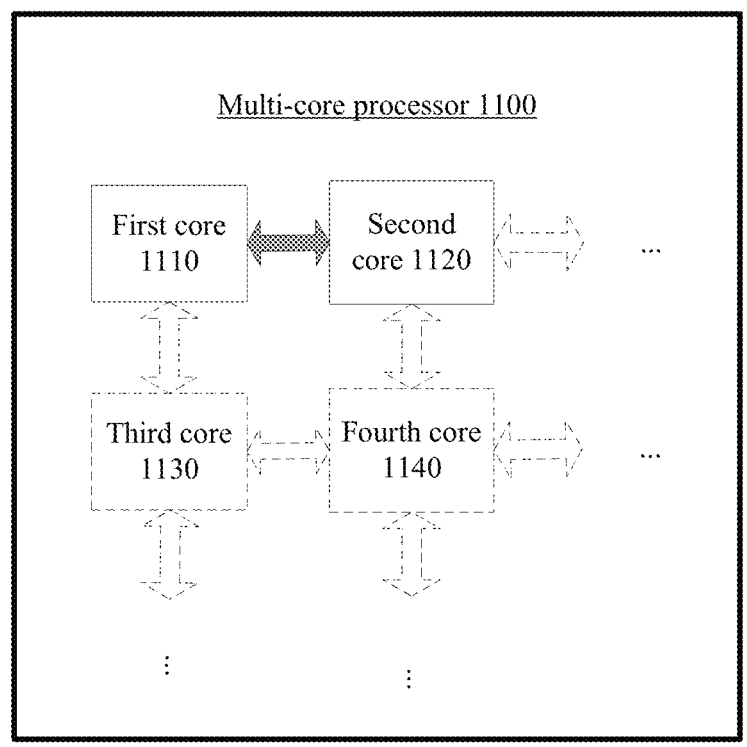
FIG. 11 is a schematic block diagram of a multi-core processor according to an embodiment of the present disclosure.

FIG. 11 is a schematic block diagram of a multi-core processor 1100 according to an embodiment of the present disclosure.

As shown in FIG. 11, the multi-core processor 1100 includes a first core 1110 and a second core 1120. Optionally, a third core 1130 may be further included. Optionally, a fourth core 1140 may further be included. Similar to FIG. 1, each core of the multi-core processor 1100 includes a processing module, a network-on-chip interface (Switch), and a caching module, where, for example, the caching module includes a level 1 cache (L1) and a level 2 cache (L2). The processing module of each core includes a TLB. The cores are connected to each other by using a network on chip and communicate with each other by using the network-on-chip interface.

It should be understood that the multi-core processor 1100 in this embodiment of the present disclosure may further include more cores. For example, the multi-core processor 1100 may include 8 cores, 10 cores, 16 cores, or 32 cores. This is not limited in this embodiment of the present disclosure.

It should also be understood that in this embodiment of the present disclosure, the first core may be any core of the multi-core processor. For ease of representation, a $1^{st}$ core in FIG. 1 is used as the first core for description, but this embodiment of the present disclosure is not limited thereto. It should also be understood that in actual application, the second core may be any core, other than the first core, in the multi-core processor, that is, the second core may not be directly connected to the first core. For ease of representation, in FIG. 11, an example in which the second core is directly connected to the first core is used for description, but this embodiment of the present disclosure is not limited thereto. Likewise, for ease of representation, in FIG. 11, the third core and the fourth core in the following are directly connected to the first core or the second core, but this embodiment of the present disclosure is not limited thereto.

It should be understood that the multi-core processor shown in FIG. 11 corresponds to the method embodiments in FIG. 1 to FIG. 10. The multi-core processor 1100 in FIG. 11 can implement each procedure of the method provided in FIG. 1 to FIG. 10. To avoid repetition, detailed descriptions are omitted properly in this embodiment of the present disclosure.

Specifically, the first core 1110 is configured to receive a first address translation request, and query a TLB of the first core based on the first address translation request;

when determining that a first target TLB entry corresponding to the first address translation request is missing in the TLB of the first core, obtain the first target TLB entry; and when determining that entry storage in the TLB of the first core is full, determine a second core from cores in an idle state in the multi-core processor; and replace a first entry in the TLB of the first core with the first target TLB entry.

The second core 1120 is configured to store the first entry into a TLB of the second core.

It should be understood that in this embodiment of the present disclosure, the first core may be called a master core of the second core, and the second core may be called a slave core of the first core.

In this embodiment of the present disclosure, when the entry storage in the TLB of the first core is full and the first target TLB entry is missing, the first target TLB entry is obtained to replace the first entry in the TLB of the first core, and the first entry is stored into the TLB of the second core, that is, the replaced entry is stored into the TLB of the second core. Therefore, in this embodiment of the present disclosure, a TLB resource of an idle core is used to expand a TLB capacity of a working core, thereby reducing a TLB miss rate and accelerating program execution.

Because the working core, namely the master core (Master) (for example, the first core), writes the replaced TLB entry into the TLB of the idle node, namely the slave core (Slave) (for example, the second core), when the working core needs to use the replaced TLB entry again, the working core does not need to obtain the entry again by using an operating system, but can obtain the entry by directly accessing the TLB of the slave. This greatly reduces a TLB refilling delay and accelerates program execution.

It should be noted that in this embodiment of the present disclosure, an idle core can share a TLB resource of the idle core with only one working core for use, and the working core may obtain TLB resources of a plurality of idle cores to store TLB entries.

Optionally, when obtaining the first target TLB entry, the first core 1110 is specifically configured to:

obtain the first target TLB entry from a page table in a memory; or obtain the first target TLB entry from another core in a multi-core system.

For example, the first core may broadcast a TLB query request to other cores of the multi-core system, where the broadcast TLB query request carries a virtual address causing a miss, that is, a virtual address corresponding to the first target TLB entry. After receiving the broadcast address, the other cores search local TLBs for the virtual address. If a TLB of a processor core is hit, the first target TLB entry may be fed back to the first core.

In this way, the first core can rapidly obtain the first target TLB entry from the another core, thereby avoiding that the first core sends a query request to the operating system to obtain the first target TLB entry from the memory. This can save time and improve application efficiency.

In addition, the first core may also obtain the first target TLB entry from the page table of the memory. For example, the first core sends the query request to the operating system, where the query request carries the virtual address causing the miss, and obtains the first target TLB entry from the page table of the memory after processing of the operating system. This is not limited in this embodiment of the present disclosure.

Further, when determining the second core from the cores in the idle state in the multi-core processor, the first core 1110 is specifically configured to:

send a status query request to each of other cores in the multi-core processor, where the status query request is used to query whether each core is in the idle state;

receive a response message sent by each of the other cores, where the response message is used to indicate whether each core is in the idle state; and select, based on the response message, a core from the cores in the idle state as the second core.

Therefore, in this embodiment of the present disclosure, the replaced TLB entry is stored by using a TLB resource in the idle core. This not only increases utilization of the TLB resource of the idle core, but also indirectly increases a capacity of the TLB of the first core, reduces a possibility of obtaining the target TLB entry by the first core from the memory, and accelerates program execution.

Further, when selecting a core from the cores in the idle state as the second core based on the response message, the first core 1110 is specifically configured to:

determine, based on the response message, an idle-core list, where the idle-core list includes a core in the idle state in other cores, other than the first core, in the multi-core processor; and select, from the idle-core list, an idle core with minimum overheads for communicating with the first core, as the second core.

Therefore, in this embodiment of the present disclosure, the first core selects the idle core with the minimum overheads for communicating with the first core as the second core, and stores a replaced TLB entry into the second core, thereby reducing communication overheads to a greatest extent. In addition, when the first core needs to query for an entry in the TLB of the second core, because the communication overheads are very low, the first core can quickly find the TLB entry, thereby improving program execution efficiency.

Further, when selecting the idle core with the minimum overheads for communicating with the first core as the second core, the first core 1110 is specifically configured to:

use an idle core that is in the idle-core list and that has minimum hops for communication with the first core, as the second core; or use an idle core that is in the idle-core list and that is at a shortest physical distance from the first core, as the second core.

Optionally, after determining the second core, the first core 1110 is further configured to record an identifier of the second core into a TLB spare core list of the first core.

Therefore, in this embodiment of the present disclosure, when the TLB entry storage of the first core is full and the first target TLB entry is missing, the first target TLB entry is obtained, the second core is determined, and the second core is recorded into the spare core list of the first core. In this way, based on the spare core list, the first core may read/write the TLB of the second core in the spare core list, thereby increasing the capacity of the TLB of the first core, reducing a TLB miss rate of the first core, and accelerating program execution.

Optionally, the first core 1110 is further configured to:

receive a second address translation request, and query the TLB of the first core based on the second address translation request;

when determining that a second target TLB entry corresponding to the second address translation request is missing in the TLB of the first core, query the TLB of the second core; and when finding the second target TLB entry in the TLB of the second core, replace a second entry in the TLB of the first core with the second target TLB entry; and the second core 1120 is further configured to store the second entry into the TLB of the second core.

Therefore, in this embodiment of the present disclosure, a working core has permission to read/write a TLB of an idle core. Using a TLB resource in the idle core to save a replaced TLB entry not only increases utilization of the TLB resource of the idle core, but further increases the capacity of the TLB of the first core. When an entry is missing in the TLB of the first core, the target entry may be read from the TLB of the slave core, thereby reducing a possibility of obtaining the target TLB entry by the first core from the memory, accelerating program execution, and improving program execution efficiency.

Optionally, the first core 1110 is further configured to:

receive a third address translation request, and query the TLB of the first core based on the third address translation request;

when determining that a third target TLB entry corresponding to the third address translation request is missing in the TLB of the first core, query the TLB of the second core;

when determining that the third target TLB entry is missing in the TLB of the second core, obtain the third target TLB entry;

when determining that entry storage in both the TLB of the first core and the TLB of the second core is full, determine a third core 1130 from the cores in the idle state in the multi-core processor; and replace a third entry in the TLB of the first core with the third target TLB entry; and the third core 1130 is configured to store the third entry into a TLB of the third core 1130.

Therefore, in this embodiment of the present disclosure, after storage of all current slave cores is full, a new slave core is obtained to save the replaced TLB entry, further expanding the capacity of the first core. When the first core queries for the replaced TLB entry again, the first core can directly read from the new slave core, and the first core does not need to obtain the TLB entry from the memory. Therefore, in this embodiment of the present disclosure, program execution can be accelerated and program execution efficiency can be improved.

Optionally, after the first core switches from a working state to the idle state, the first core is further configured to:

send a TLB release instruction to a core recorded in the TLB spare core list, where the TLB release instruction is used to instruct the core recorded in the spare core list to terminate TLB sharing.

Therefore, in this embodiment of the present disclosure, after the first core switches to the idle state, the first core releases an obtained TLB resource of a slave core by sending a release instruction to all slave cores. In this way, the TLB resource of the slave core (the idle core) is released, avoiding resource waste. Further, the released TLB resource of the slave core can be used by another working core, thereby increasing a capacity of the another working core and accelerating program execution of the working core.

Optionally, after the second core switches from the idle state to the working state, the second core is configured to send a TLB sharing termination request to the first core, where the TLB sharing termination request carries the identifier of the second core; and the first core is further configured to: receive the TLB sharing termination request, and delete the identifier of the second core from the TLB spare core list.

Therefore, in this embodiment of the present disclosure, after the second core switches from the idle state to the working state, the second core sends the TLB sharing termination request to the first core, so that the first core releases the second core, and the second core can use the TLB resource of the second core. This avoids an impact on ongoing service processing in the second core. In addition, the second core may also become another master core and can use a TLB resource of another idle core.

Optionally, the first core is further configured to determine a fourth core 1140 from the cores in the idle state in the multi-core processor, where a TLB of the fourth core 1140 is used to store all entries in the TLB of the second core 1120.

Therefore, in this embodiment of the present disclosure, the first core obtains a new slave core (the fourth core) to save all entries in the TLB of the released second core. If the first core needs to query for an entry in the second core in a subsequent query, the first core does not need to re-obtain the entry from the memory by using the operating system. Instead, the first core can directly access the TLB of the slave core (the fourth core) to obtain the entry. This greatly reduces a TLB refilling delay and accelerates program execution.

It should be noted that in this embodiment of the present disclosure, a flag register is configured for each core of the multi-core processor, where the flag register is used to record a status flag, a master core (Master) flag, and a slave core (Slave) flag of the core.

The status flag is used to indicate an operating status and a sharing status of the core. The operating status includes an idle state or a working state. The sharing status includes a master core state, a slave core state, or a no-sharing state. The master core state indicates that the core is in the working state and uses a TLB resource of another idle core to manage a TLB entry, and the slave core state indicates that the core is in the idle state and shares a TLB resource with the master core.

The master core flag is used to indicate an idle-core list, a slave core (Slave) list (also called a spare core list), and a full slave core (Full Slave) list when the core is the master core. The idle-core list is used to indicate a vector of all idle cores, the slave core list is used to indicate a vector of all slave cores of the core, and the full slave core list is used to indicate a vector of all full slave cores of the core.

The slave core flag is used to indicate a master core (Master) number and a write position of a replaced entry when the core is the slave core. The master core number includes an identifier of a unique master core of the core, and the write position of the replaced entry includes a write position of the replaced entry of the master core in the slave core.

Specifically, to implement a TLB resource sharing method proposed in the present disclosure, some registers need to be added to each node to save a flag, including the status flag, the master flag, and the slave flag. Because each node may become a master or a slave, the three flags are configured for each node, for example, as shown in the foregoing Table 1. Details are not described herein again.

Therefore, in this embodiment of the present disclosure, setting of a flag enables a master core to read/write a TLB resource of a slave core, which expands a capacity of a TLB of the master core, and also reduces a possibility of obtaining the target TLB entry by the first core from the memory. This can accelerate program execution and improve program execution efficiency.

It should be understood that "one embodiment" or "an embodiment" mentioned in this specification means that particular features, structures, or characteristics related to the embodiment are included in at least one embodiment of the present disclosure. Therefore, "in one embodiment" or "in an embodiment" that appears throughout the whole specification does not necessarily mean a same embodiment. Moreover, the particular features, structures or characteristics may be combined in one or more embodiments in any proper manner. It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present disclosure, "B corresponding to A" indicates that B is associated with A, and B may be determined according to A. However, it should further be understood that determining B according to A does not mean that B is determined according to A only; that is, B may also be determined according to A and/or other information.

A person of ordinary skill in the art may be aware that, the units and steps in the examples described with reference to the embodiments disclosed herein may be implemented by electrical hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present disclosure includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In conclusion, what are described above are merely examples of embodiments of the technical solutions of the present disclosure, but is not intended to limit the protection scope of the present disclosure. Any modification, equivalent replacement, or improvement made without departing from the spirit and principle of the present disclosure shall fall within the protection scope of the present disclosure.

What is claimed is:

1. A translation lookaside buffer (TLB) management method, applied to a multi-core processor, wherein the multi-core processor comprises a first core, the first core comprises a TLB, and the method comprises:
   receiving, by the first core, a first address translation request, and querying the TLB of the first core based on the first address translation request;
   determining, by the first core, that a first target TLB entry corresponding to the first address translation request is missing in the TLB of the first core;
   obtaining, by the first core, the first target TLB entry;
   determining, by the first core, that entry storage in the TLB of the first core is full;

determining, by the first core, a second core from cores in an idle state in the multi-core processor; and replacing, by the first core, a first entry in the TLB of the first core with the first target TLB entry, and storing the first entry into a TLB of the second core, and wherein the determining, by the first core, the second core from the cores in the idle state in the multi-core processor comprises:

sending, by the first core, a status query request to each of other cores in the multi-core processor, wherein the status query request is used to query whether each core is in the idle state;

receiving, by the first core, a response message sent by each of the other cores, wherein the response message is used to indicate whether each core is in the idle state; and selecting, by the first core based on the response message, one the cores in the idle state as the second core.

2. The method according to claim 1, wherein the selecting, by the first core based on the response message, the one of the cores in the idle state as the second core comprises:

determining, by the first core based on the response message, an idle-core list, wherein the idle-core list comprises the cores in the idle state, other than the first core, in the multi-core processor; and selecting, from the idle-core list, an idle core with minimum overhead for communicating with the first core, as the second core.

3. The method according to claim 2, wherein the selecting, from the idle-core list, the idle core with minimum overhead for communicating with the first core, as the second core comprises:

using, by the first core, an idle core that is in the idle-core list and that has minimum hops for communication with the first core, as the second core.

4. A translation lookaside buffer (TLB) management method, applied to a multi-core processor, wherein the multi-core processor comprises a first core, the first core comprises a TLB, and the method comprises:

receiving, by the first core, a first address translation request, and querying the TLB of the first core based on the first address translation request;

determining, by the first core, that a first target TLB entry corresponding to the first address translation request is missing in the TLB of the first core;

obtaining, by the first core, the first target TLB entry;

determining, by the first core, that entry storage in the TLB of the first core is full;

determining, by the first core, a second core from cores in an idle state in the multi-core processor;

recording, by the first core, an identifier of the second core in a TLB spare core list of the first core; and replacing, by the first core, a first entry in the TLB of the first core with the first target TLB entry, and storing the first entry into a TLB of the second core.

5. The method according to claim 1, wherein after the determining, by the first core, the second core from the cores in the idle state in the multi-core processor, the method further comprises:

receiving, by the first core, a second address translation request, and querying the TLB of the first core based on the second address translation request;

determining that a second target TLB entry corresponding to the second address translation request is missing in the TLB of the first core;

querying, by the first core, the TLB of the second core;

finding the second target TLB entry in the TLB of the second core;

replacing a second entry in the TLB of the first core with the second target TLB entry, and storing the second entry into the TLB of the second core.

6. The method according to claim 1, wherein the method further comprises:

receiving, by the first core, a third address translation request, and querying the TLB of the first core based on the third address translation request;

determining that a third target TLB entry corresponding to the third address translation request is missing in the TLB of the first core;

querying, by the first core, the TLB of the second core;

determining that the third target TLB entry is missing in the TLB of the second core, obtaining the third target TLB entry;

determining that entry storage in both the TLB of the first core and the TLB of the second core is full;

determining, by the first core, a third core from the cores in the idle state in the multi-core processor;

replacing, by the first core, a third entry in the TLB of the first core with the third target TLB entry;

storing the third entry into a TLB of the third core.

7. The method according to claim 4, wherein after the first core switches from a working state to the idle state, the method further comprises:

sending, by the first core, a TLB release instruction to a core recorded in the TLB spare core list, wherein the TLB release instruction is used to instruct the core recorded in the spare core list to terminate TLB sharing.

8. The method according to claim 4, wherein after the second core switches from the idle state to a working state, the method further comprises:

receiving, by the first core, a TLB sharing termination request sent by the second core, wherein the TLB sharing termination request carries the identifier of the second core; and deleting, by the first core, the identifier of the second core from the TLB spare core list.

9. The method according to claim 8, wherein before the deleting, by the first core, the identifier of the second core from the TLB spare core list, the method further comprises:

determining, by the first core, a fourth core from the cores in the idle state in the multi-core processor; and copying, by the first core, all entries from the TLB of the second core to a TLB of the fourth core.

10. The method according to claim 1, wherein the obtaining the first target TLB entry comprises:

obtaining, by the first core, the first target TLB entry from a page table in a memory.

11. A multi-core processor comprising a first core, wherein the first core comprises a translation lookaside buffer (TLB) and the first core is configured to:

receive a first address translation request; query the TLB of the first core based on the first address translation request; determine that a first target TLB entry corresponding to the first address translation request is missing in the TLB of the first core; obtain the first target TLB entry; determine that entry storage in the TLB of the first core is full, determine a second core from cores in an idle state in the multi-core processor; and replace a first entry in the TLB of the first core with the first target TLB entry, wherein the second core is configured to store the first entry into a TLB of the second core, and wherein when determining the second core from the cores in the idle state in the multi-core processor, the first core is further configured to:
send a status query request to each of other cores in the multi-core processor, wherein the status query request is used to query whether each core is in the idle state; receive a response message sent by each core, wherein the response message is used to indicate whether each core is in the idle state; and select, based on the response message, one of the cores in the idle state as the second core.

12. The multi-core processor according to claim 11, wherein when selecting, based on the response message, the one of the cores in the idle state as the second core, the first core is further configured to:
determine an idle-core list based on the response message, wherein the idle-core list comprises the cores in the idle state, other than the first core, in the multi-core processor; and select, from the idle-core list, an idle core with minimum overhead for communicating with the first core, as the second core.

13. The multi-core processor according to claim 12, wherein when selecting the idle core with the minimum overhead for communicating with the first core as the second core, the first core is further configured to:
use an idle core that is in the idle-core list and that has minimum hops for communication with the first core, as the second core.

14. The multi-core processor according to claim 11, wherein after determining the second core, the first core is further configured to record an identifier of the second core in a TLB spare core list of the first core.

15. The multi-core processor according to claim 14, wherein the first core is further configured to:
receive a second address translation request, and query the TLB of the first core based on the second address translation request;
determine that a second target TLB entry corresponding to the second address translation request is missing in the TLB of the first core;
query the TLB of the second core;
find the second target TLB entry in the TLB of the second core;
replace a second entry in the TLB of the first core with the second target TLB entry; and
the second core is further configured to store the second entry into the TLB of the second core.

16. The multi-core processor according to claim 14, wherein the first core is further configured to:
receive a third address translation request, and query the TLB of the first core based on the third address translation request;
determine that a third target TLB entry corresponding to the third address translation request is missing in the TLB of the first core;
query the TLB of the second core;
determine that the third target TLB entry is missing in the TLB of the second core;
obtain the third target TLB entry;
determine that entry storage in both the TLB of the first core and the TLB of the second core is full;
determine a third core from the cores in the idle state in the multi-core processor;
replace a third entry in the TLB of the first core with the third target TLB entry; and
the third core is configured to store the third entry into a TLB of the third core.

17. The multi-core processor according to claim 14, wherein after the first core switches from a working state to the idle state, the first core is further configured to:
send a TLB release instruction to a core recorded in the TLB spare core list, wherein the TLB release instruction is used to instruct the core recorded in the spare core list to terminate TLB sharing.

18. The multi-core processor according to claim 14, wherein after the second core switches from the idle state to a working state,
the second core is further configured to send a TLB sharing termination request to the first core, wherein the TLB sharing termination request carries the identifier of the second core; and
the first core is further configured to receive the TLB sharing termination request, and delete the identifier of the second core from the TLB spare core list.

* * * * *